United States Patent
Lutnick et al.

(10) Patent No.: US 9,292,865 B2
(45) Date of Patent: *Mar. 22, 2016

(54) DYNAMIC KEYBOARD FOR TRADING

(75) Inventors: Howard W Lutnick, New York, NY (US); Stuart Fraser, Armonk, NY (US); Bijoy Paul, North Brunswick, NJ (US)

(73) Assignee: Cantor Fitzgerald, L.P. CFPH, LLC, New York, NY (US)

( * ) Notice: Subject to any disclaimer, the term of this patent is extended or adjusted under 35 U.S.C. 154(b) by 1779 days.

This patent is subject to a terminal disclaimer.

(21) Appl. No.: 11/080,322

(22) Filed: Mar. 15, 2005

(65) Prior Publication Data

US 2005/0160032 A1 Jul. 21, 2005

Related U.S. Application Data

(63) Continuation of application No. 10/251,717, filed on Sep. 20, 2002, now Pat. No. 6,963,856, which is a continuation of application No. 09/216,464, filed on Dec. 18, 1998, now Pat. No. 6,850,907, which is a continuation-in-part of application No. 08/766,733, filed on Dec. 13, 1996, now Pat. No. 5,905,974.

(51) Int. Cl.
  *G06Q 40/00* (2006.01)
  *G06Q 30/06* (2012.01)
  *G06Q 40/04* (2012.01)

(52) U.S. Cl.
  CPC ............... *G06Q 30/06* (2013.01); *G06Q 40/04* (2013.01)

(58) Field of Classification Search
  USPC .................................. 705/37, 35, 36 R, 36 T
  See application file for complete search history.

(56) References Cited

U.S. PATENT DOCUMENTS

| 2,134,118 | A | 10/1938 | Foss ......................... 340/825.26 |
| 3,249,919 | A | 5/1966 | Scantlin .................... 340/825.26 |
| 3,541,526 | A | 11/1970 | Levy et al. |
| 3,573,747 | A | 4/1971 | Adams et al. ..................... 705/37 |
| 3,581,072 | A | 5/1971 | Nymeyer ......................... 705/37 |
| 3,656,148 | A | 4/1972 | Belcher ......................... 345/2.1 |
| D225,858 | S | 1/1973 | Kline |

(Continued)

FOREIGN PATENT DOCUMENTS

| AU | 691467 | 5/1998 |
| DE | 19606467 | 8/1997 |

(Continued)

OTHER PUBLICATIONS

Levitt, Mark 1996. New PanoView 600 brings big images to small spaces and modular systems. Business Wire Oct. 2, 1996. p. 1. http://www.proquest.com/ (accessed Jul. 22, 2008).*

(Continued)

*Primary Examiner* — Greg Pollock
(74) *Attorney, Agent, or Firm* — Glen R. Farbanish

(57) ABSTRACT

Data processing systems and methods for managing transactions in auction-based trading of specialized items such as fixed income instruments are presented. The data processing system provides a highly structured trading protocol implemented through a sequence of trading paradigms. The system employs a distributed computer processing network linking together a plurality of commonly configured program-controlled workstations. The protocol and its program-controlling logic improves trading efficiency, rewards market Makers, and fairly distributes market opportunity to system users.

38 Claims, 13 Drawing Sheets

(56) References Cited

U.S. PATENT DOCUMENTS

| | | | |
|---|---|---|---|
| 3,976,840 A | 8/1976 | Cleveland et al. | 379/93.02 |
| 4,141,001 A | 2/1979 | Suzuki et al. | |
| 4,412,287 A | 10/1983 | Braddock, III | 705/37 |
| 4,551,717 A | 11/1985 | Dreher | |
| 4,674,044 A | 6/1987 | Kalmus et al. | 705/37 |
| 4,677,552 A * | 6/1987 | Sibley, Jr. | 705/37 |
| 4,789,928 A | 12/1988 | Fujisaki | 705/37 |
| 4,799,156 A | 1/1989 | Shavit et al. | 705/26 |
| 4,823,265 A | 4/1989 | Nelson | 705/35 |
| 4,903,201 A | 2/1990 | Wagner | 705/37 |
| 4,906,117 A | 3/1990 | Birdwell | |
| D308,693 S | 6/1990 | Sakaguchi et al. | |
| 4,951,196 A | 8/1990 | Jackson | |
| 4,980,826 A | 12/1990 | Wagner | 705/37 |
| 5,038,284 A | 8/1991 | Kramer | 705/37 |
| 5,077,665 A | 12/1991 | Silverman et al. | |
| 5,101,353 A | 3/1992 | Lupien et al. | 705/37 |
| D327,057 S | 6/1992 | Gosch | |
| 5,136,501 A | 8/1992 | Silverman et al. | 705/37 |
| 5,150,118 A | 9/1992 | Finkle et al. | |
| 5,168,446 A | 12/1992 | Wiseman | 705/37 |
| 5,181,809 A | 1/1993 | Martin | |
| 5,193,924 A | 3/1993 | Larson | |
| 5,195,031 A | 3/1993 | Ordish | |
| D335,660 S | 5/1993 | Busch | |
| 5,243,331 A | 9/1993 | McCausland et al. | 345/172 |
| 5,253,940 A | 10/1993 | Abecassis | |
| 5,258,908 A | 11/1993 | Hartheimer et al. | |
| 5,297,031 A | 3/1994 | Gutterman et al. | 705/37 |
| 5,297,032 A | 3/1994 | Trojan et al. | 705/37 |
| 5,305,200 A | 4/1994 | Hartheimer et al. | 705/37 |
| 5,339,392 A | 8/1994 | Risberg et al. | |
| 5,347,452 A | 9/1994 | Bay, Jr. | |
| 5,361,199 A | 11/1994 | Shoquist et al. | 705/26 |
| 5,367,298 A | 11/1994 | Axthelm | |
| 5,375,055 A | 12/1994 | Togher et al. | 705/37 |
| 5,463,547 A | 10/1995 | Markowitz et al. | 715/507 |
| 5,579,002 A | 11/1996 | Iggulden et al. | |
| 5,615,109 A | 3/1997 | Eder | |
| 5,640,569 A | 6/1997 | Miller et al. | |
| 5,667,319 A | 9/1997 | Satloff | |
| 5,668,358 A | 9/1997 | Wolf et al. | |
| 5,689,652 A | 11/1997 | Lupien et al. | 395/237 |
| 5,710,889 A | 1/1998 | Clark et al. | 395/244 |
| 5,715,402 A | 2/1998 | Popolo | 705/37 |
| 5,717,989 A | 2/1998 | Tozzoli et al. | 705/37 |
| 5,727,165 A | 3/1998 | Ordish et al. | 705/37 |
| 5,757,292 A | 5/1998 | Amro et al. | |
| 5,774,880 A | 6/1998 | Ginsberg | |
| 5,787,402 A | 7/1998 | Potter et al. | 705/37 |
| 5,794,207 A | 8/1998 | Walker et al. | |
| 5,794,219 A | 8/1998 | Brown | 705/37 |
| 5,802,497 A | 9/1998 | Manasse | |
| 5,826,244 A | 10/1998 | Huberman | 705/37 |
| 5,832,462 A | 11/1998 | Midorikawa et al. | 705/35 |
| 5,835,896 A | 11/1998 | Fisher et al. | 705/37 |
| 5,842,178 A | 11/1998 | Giovannoli | 705/26 |
| 5,845,261 A | 12/1998 | McAbian | |
| 5,845,266 A | 12/1998 | Lupien | |
| 5,873,071 A | 2/1999 | Ferstenberg et al. | 705/37 |
| 5,878,139 A | 3/1999 | Rosen | |
| 5,890,138 A | 3/1999 | Godin et al. | 705/26 |
| 5,905,974 A | 5/1999 | Fraser et al. | |
| 5,905,975 A | 5/1999 | Ausubel | |
| 5,914,715 A | 6/1999 | Sasaki | |
| 5,915,209 A | 6/1999 | Lawrence | 340/3.7 |
| 5,924,082 A | 7/1999 | Silverman et al. | 705/37 |
| 5,926,801 A | 7/1999 | Matsubara et al. | 705/37 |
| 5,950,176 A | 9/1999 | Keiser et al. | |
| 5,963,923 A | 10/1999 | Garber | |
| 5,987,419 A | 11/1999 | Hachino et al. | 705/1 |
| 6,014,627 A | 1/2000 | Togher et al. | 705/1 |
| 6,016,483 A | 1/2000 | Rickard et al. | 705/37 |
| 6,029,146 A | 2/2000 | Hawkins et al. | 705/35 |
| 6,055,504 A | 4/2000 | Chou et al. | |
| 6,085,168 A | 7/2000 | Mori et al. | |
| 6,098,051 A | 8/2000 | Lupien et al. | |
| 6,119,101 A | 9/2000 | Peckover | |
| 6,131,085 A | 10/2000 | Rossides | |
| 6,134,535 A | 10/2000 | Belzberg | 705/37 |
| 6,141,653 A | 10/2000 | Conklin et al. | |
| 6,151,588 A | 11/2000 | Tozzoli et al. | 705/37 |
| 6,195,647 B1 | 2/2001 | Martyn et al. | |
| 6,199,050 B1 | 3/2001 | Alaia et al. | |
| 6,211,880 B1 | 4/2001 | Impink, Jr. | |
| 6,230,146 B1 | 5/2001 | Alaia et al. | 705/37 |
| 6,230,147 B1 | 5/2001 | Alaia et al. | |
| 6,243,691 B1 | 6/2001 | Fisher et al. | |
| 6,247,000 B1 | 6/2001 | Hawkins et al. | 705/37 |
| 6,259,044 B1 | 7/2001 | Paratore et al. | |
| 6,263,321 B1 | 7/2001 | Daughtery, III | 705/36 |
| 6,272,474 B1 | 8/2001 | Garcia | |
| 6,278,982 B1 | 8/2001 | Korhammer et al. | |
| 6,282,521 B1 | 8/2001 | Howorka | 705/37 |
| 6,311,178 B1 | 10/2001 | Bi et al. | 707/3 |
| 6,317,727 B1 | 11/2001 | May | |
| 6,317,728 B1 | 11/2001 | Kane | |
| 6,343,278 B1 | 1/2002 | Jain et al. | 705/37 |
| 6,363,365 B1 | 3/2002 | Kou | |
| 6,405,180 B2 | 6/2002 | Tilfors et al. | 705/37 |
| 6,421,653 B1 | 7/2002 | May | |
| 6,434,536 B1 | 8/2002 | Geiger | |
| 6,438,575 B1 | 8/2002 | Khan et al. | |
| 6,477,513 B1 | 11/2002 | Walker et al. | |
| 6,505,174 B1 | 1/2003 | Keiser et al. | 705/37 |
| 6,510,418 B1 | 1/2003 | Case et al. | |
| 6,519,574 B1 | 2/2003 | Wilton et al. | 705/35 |
| 6,625,583 B1 | 9/2003 | Silverman et al. | |
| 6,629,082 B1 | 9/2003 | Hambrecht | |
| D491,944 S | 6/2004 | Lutnick et al. | |
| 6,772,132 B1 | 8/2004 | Kemp, II et al. | |
| D496,663 S | 9/2004 | Lutnick et al. | |
| D497,912 S | 11/2004 | Lutnick et al. | |
| D498,476 S | 11/2004 | Lutnick et al. | |
| 6,823,318 B1 | 11/2004 | Creswell et al. | |
| 6,850,907 B2 | 2/2005 | Lutnick et al. | |
| D502,467 S | 3/2005 | Lutnick et al. | |
| D503,712 S | 4/2005 | Lutnick et al. | |
| D503,713 S | 4/2005 | Lutnick et al. | |
| D503,935 S | 4/2005 | Lutnick et al. | |
| D504,131 S | 4/2005 | Lutnick et al. | |
| 6,903,662 B2 | 6/2005 | Rix et al. | |
| 6,912,126 B2 | 6/2005 | Rudd et al. | |
| 6,963,856 B2 | 11/2005 | Lutnick et al. | |
| 6,965,511 B2 | 11/2005 | Rudd et al. | |
| D516,072 S | 2/2006 | Lutnick et al. | |
| 7,000,181 B2 | 2/2006 | Press | |
| 7,003,488 B2 | 2/2006 | Dunne et al. | |
| 7,076,461 B2 | 7/2006 | Balabon | |
| 7,080,033 B2 | 7/2006 | Wilton et al. | |
| 7,157,651 B2 | 1/2007 | Rix et al. | |
| 7,243,083 B2 | 7/2007 | Burns et al. | |
| 7,283,067 B2 | 10/2007 | Lutnick et al. | |
| 7,392,212 B2 | 6/2008 | Hancock et al. | |
| 7,392,214 B1 | 6/2008 | Fraser et al. | |
| 7,392,217 B2 | 6/2008 | Gilbert et al. | |
| 7,400,270 B2 | 7/2008 | Lutnick et al. | |
| 7,496,533 B1 | 2/2009 | Keith | |
| 7,523,064 B2 | 4/2009 | Burns et al. | |
| 7,552,084 B2 | 6/2009 | Fraser et al. | |
| 7,617,144 B2 | 11/2009 | Madoff et al. | |
| 7,769,668 B2 | 8/2010 | Balabon | |
| 7,941,364 B2 | 5/2011 | Peterffy et al. | |
| 2001/0003179 A1 | 6/2001 | Martyn et al. | |
| 2001/0037279 A1 | 11/2001 | Yeo | |
| 2002/0023037 A1 | 2/2002 | White | 705/37 |
| 2002/0023041 A1 | 2/2002 | Brett | 705/37 |
| 2002/0026321 A1 | 2/2002 | Faris et al. | |
| 2002/0029180 A1 | 3/2002 | Kirwin et al. | |
| 2002/0070915 A1 | 6/2002 | Mazza et al. | |
| 2002/0073014 A1 | 6/2002 | Gilbert | |
| 2002/0082976 A1 | 6/2002 | Howorka | 705/37 |
| 2002/0091626 A1 | 7/2002 | Johnson et al. | 705/37 |
| 2002/0107784 A1 | 8/2002 | Hancock et al. | |

(56) References Cited

U.S. PATENT DOCUMENTS

| | | |
|---|---|---|
| 2002/0128945 A1 | 9/2002 | Moss et al. |
| 2002/0133456 A1 | 9/2002 | Lancaster et al. |
| 2002/0143690 A1 | 10/2002 | Mahajan et al. |
| 2002/0154038 A1 | 10/2002 | Houston |
| 2002/0156716 A1 | 10/2002 | Adatia |
| 2002/0161690 A1 | 10/2002 | McCarthy et al. |
| 2002/0169703 A1 | 11/2002 | Lutnick et al. |
| 2002/0169704 A1 | 11/2002 | Gilbert |
| 2002/0178104 A1 | 11/2002 | Hausman |
| 2002/0198815 A1 | 12/2002 | Greifeld et al. |
| 2003/0004862 A1 | 1/2003 | Lutnick et al. |
| 2003/0009411 A1 | 1/2003 | Ram et al. |
| 2003/0033239 A1 | 2/2003 | Gilbert |
| 2003/0050888 A1 | 3/2003 | Satow et al. ............... 705/37 |
| 2003/0065613 A1 | 4/2003 | Smith |
| 2003/0069826 A1 | 4/2003 | Guidi et al. |
| 2003/0083976 A1 | 5/2003 | McLister |
| 2003/0097323 A1 | 5/2003 | Khalfan et al. |
| 2003/0149636 A1 | 8/2003 | Lutnick et al. |
| 2003/0229571 A1 | 12/2003 | May |
| 2003/0229900 A1 | 12/2003 | Reisman |
| 2003/0236737 A1 | 12/2003 | Kemp et al. |
| 2004/0034591 A1 | 2/2004 | Waelbroeck et al. |
| 2004/0044610 A1 | 3/2004 | Fraser et al. |
| 2004/0059666 A1 | 3/2004 | Waelbroeck et al. |
| 2004/0117292 A1 | 6/2004 | Brumfield et al. |
| 2004/0117331 A1 | 6/2004 | Lutnick et al. |
| 2004/0140998 A1 | 7/2004 | Gravina et al. |
| 2004/0143503 A1 | 7/2004 | Suthar |
| 2004/0158519 A1 | 8/2004 | Lutnick et al. |
| 2004/0193519 A1 | 9/2004 | Sweeting et al. |
| 2004/0210504 A1 | 10/2004 | Rutman |
| 2004/0210511 A1 | 10/2004 | Waelbroeck et al. |
| 2004/0210512 A1 | 10/2004 | Fraser et al. |
| 2004/0218963 A1 | 11/2004 | Van Diepen et al. |
| 2004/0243505 A1 | 12/2004 | Sweeting et al. |
| 2005/0004852 A1 | 1/2005 | Whitney |
| 2005/0038731 A1 | 2/2005 | Sweeting et al. |
| 2005/0038732 A1 | 2/2005 | Sweeting et al. |
| 2005/0055304 A1 | 3/2005 | Lutnick et al. |
| 2005/0075966 A1 | 4/2005 | Duka |
| 2005/0108079 A1 | 5/2005 | Langridge |
| 2005/0108653 A1 | 5/2005 | Langridge |
| 2005/0119966 A1 | 6/2005 | Sandholm et al. |
| 2005/0171895 A1 | 8/2005 | Howorka et al. |
| 2005/0216393 A1 | 9/2005 | Lutnick et al. |
| 2005/0222941 A1 | 10/2005 | Tull, Jr. |
| 2006/0007160 A1 | 1/2006 | Lutnick et al. |
| 2006/0059079 A1 | 3/2006 | Howorka |
| 2006/0069635 A1 | 3/2006 | Ram et al. |
| 2006/0080214 A1 | 4/2006 | Hausman et al. |
| 2006/0086726 A1 | 4/2006 | Yamamoto et al. |
| 2006/0218072 A1 | 9/2006 | Noviello |
| 2006/0229967 A1 | 10/2006 | Sweeting |
| 2006/0265304 A1 | 11/2006 | Brumfield et al. |
| 2006/0265305 A1 | 11/2006 | Schluetter et al. |
| 2006/0271475 A1 | 11/2006 | Brumfield et al. |
| 2006/0277136 A1 | 12/2006 | O'Connor et al. |
| 2007/0100735 A1 | 5/2007 | Kemp et al. |
| 2007/0150708 A1 | 6/2007 | Billeci |
| 2007/0168275 A1 | 7/2007 | Busby et al. |
| 2007/0174162 A1 | 7/2007 | Lutnick et al. |
| 2007/0226120 A1 | 9/2007 | Nanjundamoorthy |
| 2007/0244795 A1 | 10/2007 | Lutnick et al. |
| 2007/0244796 A1 | 10/2007 | Lutnick et al. |
| 2007/0250438 A1 | 10/2007 | Fraser et al. |
| 2007/0255642 A1 | 11/2007 | Keith |
| 2008/0001786 A1 | 1/2008 | Lutnick et al. |
| 2008/0071670 A1 | 3/2008 | Fraser et al. |
| 2008/0071671 A1 | 3/2008 | Fraser et al. |
| 2008/0077523 A1 | 3/2008 | Fraser et al. |
| 2008/0133401 A1 | 6/2008 | Gilbert |
| 2008/0140558 A1 | 6/2008 | Reuter et al. |
| 2009/0073004 A1 | 3/2009 | Lutnick et al. |
| 2009/0099973 A1 | 4/2009 | Gilbert |
| 2009/0229119 A1 | 9/2009 | Dailey et al. |
| 2011/0066536 A1 | 3/2011 | Milne |
| 2012/0278223 A1 | 11/2012 | Lutnick et al. |
| 2013/0132250 A1 | 5/2013 | Fraser et al. |
| 2013/0132251 A1 | 5/2013 | Fraser et al. |
| 2013/0132254 A1 | 5/2013 | Fraser et al. |
| 2014/0258078 A1 | 9/2014 | Gilbert et al. |

FOREIGN PATENT DOCUMENTS

| | | |
|---|---|---|
| EP | 399850 | 11/1990 |
| EP | 0412308 B1 | 2/1991 |
| EP | 0416482 | 3/1991 |
| EP | 0512702 | 11/1992 |
| EP | 0993995 B1 | 4/2000 |
| GB | 2256954 A | 12/1992 |
| GB | 2258061 | 1/1993 |
| GB | 2313276 | 11/1997 |
| JP | 358161068 | 9/1983 |
| JP | 59184929 | 10/1984 |
| JP | 59-195779 | 11/1984 |
| JP | 62-256164 | 11/1987 |
| JP | 6-251021 | 9/1994 |
| JP | 3036207 | 4/1997 |
| JP | 11-282600 | 3/1998 |
| JP | 10-504409 | 4/1998 |
| JP | 2768828 | 6/1998 |
| JP | 10-320494 | 12/1998 |
| JP | 2003-525480 | 4/2000 |
| JP | 2002-032565 | 7/2000 |
| JP | 2001-501333 | 1/2001 |
| KR | 1992-700435 | 2/1992 |
| WO | WO 85/04271 | 9/1985 |
| WO | WO85/04271 * | 9/1985 |
| WO | WO 87/03115 | 5/1987 |
| WO | WO 93/15467 | 8/1993 |
| WO | WO 95/06918 | 3/1995 |
| WO | WO 95/26005 | 9/1995 |
| WO | WO 97/37315 | 10/1997 |
| WO | WO 98/26363 | 6/1998 |
| WO | WO 98/41942 | 9/1998 |
| WO | WO 98/49639 | 11/1998 |
| WO | WO 98/52133 | 11/1998 |
| WO | WO 99/19821 | 4/1999 |
| WO | WO 00/11588 | 3/2000 |
| WO | WO 00/67172 | 4/2000 |
| WO | WO 01/50317 | 12/2000 |
| WO | WO 01/69366 | 9/2001 |
| WO | WO 03/026135 | 3/2003 |
| WO | WO 2004/057440 | 7/2004 |
| WO | WO2006108158 | 4/2006 |

OTHER PUBLICATIONS

"MAOI Technologies Announces IIVEeXCHANGE 2.1," PR Newswire, New York, Sep. 14, 1998, p. 1. Retrieved from ProQuest.*
USPTO Office Action for U.S. Appl. No. 11/328,814, Apr. 10, 2009; 9 pages.
USPTO Office Action for U.S. Appl. No. 10/699,858, May 6, 2009; 8 pages.
USPTO Office Action for U.S. Appl. No. 11/621,546, May 5, 2009; 17 pages.
USPTO Office Action for U.S. Appl. No. 09/859,661, Mar. 4, 2009; 3 pages.
USPTO Office Action for U.S. Appl. No. 10/382,527, May 12, 2009; 8 pages.
USPTO Office Action for U.S. Appl. No. 10/715,081, Feb. 2, 2009; 22 pages.
USPTO Office Action for U.S. Appl. No. 10/759,957, Feb. 2, 2009; 20 pages.
MAOI Technologies Announces IIVEeXCHANGE 2.1, PR Newswire, New York, Sep. 14, 1998, p. 1. Retrieved from ProQuest.
"Aurora," Chicago Board of Trade, 1990.
"APT: A Trading System for the Future", The London International Financial Futures Exchange (LIFFE).
eSPEED, Inc. et al. v. Brokertec USA, L.L.C. et al., D. Del., Civil Action No. 03-612(KAJ)—PTS Client v1.1 Beta H:1—Mar. 1998 (Exhibits 118-120, 37 pages).

(56) References Cited

OTHER PUBLICATIONS

PCT Notification of Transmittal of the International Search Report and the Written Opinion of the International Searching Authority for International Application No. PCT/US04/36126, 6 pp.
PCT Notification of Transmittal of the International Search Report and the Written Opinion of the International Searching Authority for International Application No. PCT/US05/00995, 9 pp.
Photographs of Cantor Fitzgerald Keyboard.
Photographs of BrokerTec USA, LLC trading keyboard.
"Hot Keys Now Available", Success Trader Level II—Direct Access Trading, http://web.archive.org/web20020928124458 (printed Feb. 26, 2004).
"NextTrend Releases Next Generation Electronic Direct Access Trading, EDAT, Technology Plus New and Expanded Market Analysis Features", Business Wire, Oct. 29, 2001, 2 pages, www.findarticles.com/cf_dis/m0EIN/2001_0ct29/79515988/p1/article.jhtml (printed Mar. 2, 2004).
"Neovest Updates Trade Execution", Neovest High Performance Trading Technology, Aug. 31, 2001, http://www.neovest.com/recentarticles/article2001831.html (printed Mar. 2, 2004).
Flood, Mark D. "Microstructure Theory and the Foreign Exchange Market", Federal Reserve Bank of St. Louis Review, Nov.-Dec. 1991, vol. 73, No. 6, p. 52(10), retrieved from Dialog Gale Group Trade and Industry DB, Dialog No. 05586898.
PCT Notification of Transmittal of International Search Report and the Written Opinion of the International Searching Authority, or the Declaration for International Application No. PCT/US02/18539, May 5, 2003.
Photographs of eSpeed, Inc. trading keyboard, May 9, 2004.
Photographs of second eSpeed, Inc. trading keyboard, May 9, 2004.
USPTO Office Action for U.S. Appl. No. 08/766,733, May 21, 1998.
USPTO Notice of Allowance for U.S. Appl. No. 08/766,733, Sep. 1, 1998.
USPTO Office Action for U.S. Appl. No. 10/147,218, Dec. 10, 2007 (4 pages).
USPTO Office Action for U.S. Appl. No. 10/147,218, Jan. 3, 2007 (5 pages).
USPTO Office Action for U.S. Appl. No. 10/699,859, Sep. 19, 2007 (13 pages).
USPTO Office Action for U.S. Appl. No. 10/699,859, May 22, 2008 (16 pages).
USPTO Advisory Action for U.S. Appl. No. 10/699,859, Jul. 3, 2008 (3 pages).
USPTO Office Action for U.S. Appl. No. 10/715,081, Aug. 10, 2007 (12 pages).
USPTO Office Action for U.S. Appl. No. 10/715,081, Mar. 3, 2008 (16 pages).
USPTO Advisory Action for U.S. Appl. No. 10/715,081, Mar. 28, 2008 (3 pages).
USPTO Office Action for U.S. Appl. No. 10/715,081, Apr. 30, 2008 (16 pages).
USPTO Office Action for U.S. Appl. No. 10/759,957, Aug. 20, 2007 (11 pages).
USPTO Office Action for U.S. Appl. No. 10/759,957, Feb. 28, 2008 (15 pages).
USPTO Advisory Action for U.S. Appl. No. 10/759,957, Mar. 28, 2008 (3 pages).
USPTO Office Action for U.S. Appl. No. 10/759,957, May 1, 2008 (15 pages).
USPTO Notice of Allowance for U.S. Appl. No. 11/126,781, Aug. 9, 2007 (4 pages).
USPTO Office Action for U.S. Appl. No. 10/699,858, Feb. 25, 2008 (8 pages).
*eSpeed, Inc et al. v. Brokertec USA, L.L.C.*, D. Del., Civil Action No. 03-612(KAJ), Plaintiffs' Opening Brief in Support of Their Motion for Judgment as a Matter of Law or, in the Alternative, for a New Trial, dated Apr. 4, 2005.
*eSpeed, Inc et al. v. Brokertec USA, L.L.C.*, D. Del., Civil Action No. 03-612(KAJ), Defendants' Opening Brief in Support of Motion for Judgment as a Matter of Law on Invalidity and Non-Infringement, dated Apr. 4, 2005.
*eSpeed, Inc et al. v. Brokertec USA, L.L.C.*, D. Del., Civil Action No. 03-612(KAJ), Defendants' Proposed Findings of Fact and Conclusions of Law, dated Apr. 4, 2005.
*eSpeed, Inc et al. v. Brokertec USA, L.L.C.*, D. Del., Civil Action No. 03-612(KAJ), Plaintiffs' Proposed Findings of Fact and Conclusions of Law, dated May 23, 2005.
*eSpeed, Inc et al. v. Brokertec USA, L.L.C.*, D. Del., Civil Action No. 03-612(KAJ), Plaintiffs' Answering Brief in Opposition to Defendants' Motion for Judgment as a Matter of Law, dated May 23, 2005.
*eSpeed, Inc et al. v. Brokertec USA, L.L.C.*, D. Del., Civil Action No. 03-612(KAJ), Brief in Opposition to Plaintiffs' Motion for Judgment as a Matter of Law or, in the Alternative, for a New Trial, dated May 23, 2005.
*eSpeed, Inc et al. v. Brokertec USA, L.L.C.*, D. Del., Civil Action No. 03-612(KAJ), Plaintiffs' Objections to Defendants' Proposed Findings of Fact and Conclusions of Law, dated May 23, 2005.
*eSpeed, Inc et al. v. Brokertec USA, L.L.C.*, D. Del., Civil Action No. 03-612(KAJ), Defendants' Reply in Support of Their Findings of Fact and Conclusions of Law, dated Jun. 27, 2005.
*eSpeed, Inc et al. v. Brokertec USA, L.L.C.*, D. Del, Civil Action No. 03-612(KAJ), Defendants' Reply Brief in Support of Motion for Judgment as a Matter of Law on Invalidity and Non-Infringement, dated Jun. 27, 2005.
*eSpeed, Inc et al. v. Brokertec USA, L.L.C.*, D. Del., Civil Action No. 03-612(KAJ), Plaintiffs' Reply Brief in Support of Their Motion for Judgment as a Matter of Law or, in the Alternative, for a New Trial, dated Jun. 27, 2005.
*eSpeed, Inc et al. v. Brokertec USA, L.L.C.*, D. Del., Civil Action No. 03-612(KAJ), Post-Trial Hearing, dated Oct. 12, 2005.
*eSpeed, Inc et al. v. Brokertec USA, L.L.C.*, D. Del., Civil Action No. 03-612(KAJ), Memorandum Order, dated Dec. 5, 2005.
*eSpeed, Inc et al. v. Brokertec USA, L.L.C.*, D. Del., Civil Action No. 03-612(KAJ), Post-Trial Findings of Fact and Conclusions of Law, dated Feb. 22, 2006.
*eSpeed, Inc et al. v. Brokertec USA, L.L.C.*, D. Del., Civil Action No. 03-612(KAJ), Final Judgment in a Civil Case, dated Apr. 3, 2006.
*eSpeed, Inc et al. v. Brokertec USA, L.L.C.*, D. Del., Civil Action No. 03-612(KAJ), Plaintiffs' Trial Exhibit Evidence, PX 1, 3, 9, 11, 20, 24, 30, 33, 46, 63, 79, 81, 82, 92, 96, 99, 110, 112, and 752.
*eSpeed, Inc et al. v. Brokertec USA, L.L.C.*, D. Del., Civil Action No. 03-612(KAJ), Defendants' Trial Exhibit Evidence, DX 3, 9, 10, 12, 15, 16, 23, 23A, 24, 30-33, 36, 37, 41, 42, 46-48, 50, 52, 61-63, 66, 79, 99, 114, 115, 117, 119, 133, 145-147, 159, 182, 203, 235, 280, 288, 289, 293, 298, 303, 387, 398, 401, 441, 484, 488, 548, 551, and 554.
*eSpeed, Inc et al. v. Brokertec USA, L.L.C.*, D. Del., Civil Action No. 03-612(KAJ), Trial Transcripts, Trial vols. 1-9, dated Feb. 7-17, 2005.
"EJV Aims to Launch Analytics Service by Year End," BondWeek, vol. 11, No. 38, p. 9, Sep. 23, 1991.
Ray, Christina I., The Bond Market, pp. 59-69, 1993.
Umlauf, Steven R. "Information Asymmetries and Security Market Design: An Empirical Study of the Secondary Market for U.S. Government Securities," The Journal of Finance, vol. 46, No. 3, pp. 929-953, Jul. 1991.
"U.S. Government Securities—More Transaction Information and Investor Protection Measures Are Needed," United States General Accounting Office, Report to Congressional Committees, pp. 1-10, 95-112, (Sep. 1990).
*Chicago Mercantile Exchange, Globex, 24 pages, undated.
*Rumbaugh, J. et al., "Object-Oriented Modeling and Design," pp. 84-91, 1991.
Clemons, E.K. et al., "Restructuring Institutional Block Trading: An Overview of the OptiMark System," Journal of Management Information Systems, vol. 15, No. 2, pp, 41-60, Fall 1998.
Graham, G., "Uknews: Electronic Trading: Much More a Small Fizz Than a Big Bang," Financial Times, London Edition, p. 9, Oct. 17, 1997.
Paul, B., "Declaration of Bijoy Paul," Jan. 31, 2002.
Fraser, S.A., "Declaration of Stuart A. Fraser," Feb. 1, 2002.

(56) References Cited

OTHER PUBLICATIONS

Lutnick, H.W., "Declaration of Howard W. Lutnick," Feb. 5, 2002.
*Liberty Brokerage Investment Corp., et al., v. Cantor Fitzgerald, L.P., et al.*, C.A. No. 99-522 RRM Complaint for Declaratory Relief.
*Liberty Brokerage Investment Corp., et al., v. Cantor Fitzgerald, L.P., et al.*, C.A. No. 99-522 RRM Amended Complaint for Declaratory Relief.
*Liberty Brokerage Investment Corp., et al., v. Cantor Fitzgerald, L.P., et al.*, C.A. No. 99-522 RRM Stipulated Order of Dismissal.
*eSpeed, Inc. et al. v. Brokertec USA, L.L.C. et al.*, C.A. No. 03-612(KAJ), Answers and Objections to Plaintiffs' Second Set of Interrogatories.
*eSpeed, Inc. et al. v. Brokertec USA, L.L.C. et al.*, C.A. No. 03-612, Complaint for Patent Infringement.
*eSpeed, Inc. et al. v. Brokertec USA, L.L.C. et al.*, C.A. No. 03-612, Plaintiffs' Motion for Preliminary Injunction.
*eSpeed, Inc. et al. v. Brokertec USA, L.L.C. et al.*, C.A. No. 03-612, Plaintiffs' Opening Brief in Support of Their Motion for Preliminary Injunction.
*eSpeed, Inc. et al. v. Brokertec USA, L.L.C. et al.*, C.A. No. 03-612 Declaration of Howard W. Lutnick in Support of Motion for Preliminary Injunction.
*eSpeed, Inc. et al. v. Brokertec USA, L.L.C. et al.*, C.A. No. 03-612 Declaration of Joseph C. Noviello in Support of Motion for Prliminary Injunction.
*eSpeed, Inc. et al. v. Brokertec USA, L.L.C. et al.*, C.A. No. 03-612 Plaintiffs' Motion for Expedited Discovery.
*eSpeed, Inc. et al. v . Brokertec USA, L.L.C. et al.*, C.A. No. 03-612 Plaintiffs' First Set of Expedited Interrogatories Addressed to All Defendants.
*eSpeed, Inc. et al. v. Brokertec USA, L.L.C. et al.*, C.A. No. 03-612 Plaintiffs' First Expedited Requests for Production of Documents and Things Addressed to All Defendants.
*eSpeed, Inc. et al. v. Brokertec USA, L.L.C. et al.*, C.A. No. 03-612 (KAJ) Defendant Brokertec USA, L.L.C.'S First Request for Production of Documents and Things.
*eSpeed, Inc. et al. v. Brokertec USA, L.L.C. et al.*, C.A. No. 03-612 (KAJ) Defendant Brokertec USA, L.L.C.'S First Set of Interrogatories to Plaintiffs.
*eSpeed, Inc. et al. v. Brokertec USA, L.L.C. et al.*, C.A. No. 03-612 (KAJ) Defendant Brokertec USA, L.L.C.'S First Set of Requests for Admissions.
*eSpeed, Inc. et al. v. Brokertec USA, L.L.C. et al.*, C.A. No. 03-612 (KAJ) Responses and Objections to Plaintiffs' First Requests for Production of Documents.
*eSpeed, Inc. et al. v. Brokertec USA, L.L.C. et al.*, C.A. No. 03-612 (KAJ) Answers and Objections to Plaintiffs' First Set of Interrogatories.
*eSpeed, Inc. et al. v. Brokertec USA, L.L.C. et al.*, C.A. No. 03-612 (KAJ) Plaintiffs' First Set of Requests for Admissions Directed to Defendants Brokertec USA, L.L.C.; Garban, LLC; ICAP PLC; OM AB; and OM Technology (U.S.), Inc.
*eSpeed, Inc. et al. v. Brokertec USA, L.L.C. et al.*, C.A. No. 03-612 (KAJ) Plaintiffs' Objections and Responses to Defendant Brokertec USA, L.L.C.'s First Set of Interrogatories.
*eSpeed, Inc. et al. v. Brokertec USA, L.L.C. et al.*, C.A. No. 03-612 (KAJ) Plaintiffs' Responses and Objections to Defendant Brokertec USA, L.L.C.'s First Set of Requests for Admissions.
*eSpeed, Inc. et al. v. Brokertec USA, L.L.C. et al.*, C.A. No. 03-612 (KAJ) Supplemental Answers and Objections to Plaintiffs' Second Set of Interrogatories.
*eSpeed, Inc. et al. v. Brokertec USA, L.L.C. et al.*, C.A. No. 03-612 (KAJ) Supplemental Responses to Plaintiffs' First Set of Request for Admissions.
*eSpeed, Inc. et al., v. Brokertec USA L.L.C., et al.*, C.A. No. 03-612 (KAJ), Supplemental Opening Brief in Support of Motion by Plaintiffs eSpeed, Inc., Cantor Fitzgerald, L.P., and CFPH, L.L.C. for Preliminary Injunction.
*eSpeed, Inc. et al., v. Brokertec USA L.L.C., et al.*, C.A. No. 03-612 (KAJ), Defendants' Proposed Findings of Fact and Conclusions of Law.
*eSpeed, Inc. et al. v. Brokertec USA, L.L.C. et al.*, C.A. No. 03-612 (KAJ) Answer and Counterclaim.
*eSpeed, Inc. et al. v. Brokertec USA, L.L.C. et al.*, C.A. No. 03-612 (KAJ) Notice of Subpoena Duces Tecum.
*eSpeed, Inc. et al. v. Brokertec USA, L.L.C. et al.*, C.A. No. 03-612 (KAJ) Supplemental Answers and Objections to Plaintiffs' First Set of Interrogatories.
\**eSpeed, Inc. et al., v. Brokertec USA L.L.C., et al.*, C.A. No. 03-612 (KAJ), Order.
\**eSpeed, Inc. et al., v. Brokertec USA L.L.C., et al.*, C.A. No. 03-612 (KAJ), Memorandum Order.
\**eSpeed, Inc. et al., v. Brokertec USA L.L.C., et al.*, C.A. No. 03-612 (KAJ), Opinion.
\**eSpeed, Inc. et al., v. Brokertec USA L.L.C., et al.*, C.A. No. 03-612 (KAJ), Plaintiffs' Opening Brief in Support of Their Proposed Claim Constructions.
\**eSpeed, Inc. et al., v. Brokertec USA L.L.C., et al.*, C.A. No. 03-612 (KAJ), Plaintiffs' Motion for Re-Argument on Claim Constructions.
\**eSpeed, Inc. et al., v. Brokertec USA L.L.C., et al.*, C.A. No. 03-612 (KAJ), Answer to Plaintiffs' Motion for Reargument on Claim Construction.
\**eSpeed, Inc. et al. v. Brokertec USA, L.L.C. et al.*, C.A. No. 03-612 (KAJ), Videotaped Deposition of Hitendra Manubhai Abuwala.
\**eSpeed, Inc. et al. v. Brokertec USA, L.L.C. et al.*, C.A. No. 03-612 (KAJ), Opinion and Order Re Motions for Summary Judgement, Oct. 25, 2004.
\**eSpeed, Inc. et al. v. Brokertec USA, L.L.C. et al.*, C.A. No. 03-612 (KAJ), Opinion and Order Re Reconsideration, Jan. 11, 2005.
\**eSpeed, Inc. et al. v. Brokertec USA, L.L.C. et al.*, C.A. No. 03-612 (KAJ), Revised Joint Pretrial Order and Exhibits A-J—Public Version, Jan. 2005.
*eSpeed, Inc. et al. v. Brokertec USA, L.L.C. et al.*, C.A. No. 03-612 (KAJ), Trial Transcripts, Feb. 7-Feb. 22, 2005, (11 Volumes).
\**eSpeed, Inc. et al. v. Brokertec USA, L.L.C. et al.*, C.A. No. 03-612 (KAJ), Jury's Verdict Sheet, Feb. 22, 2005.
\**eSpeed, Inc. et al. v. Brokertec USA, L.L.C. et al.*, C.A. No. 03-612 (KAJ), Defendants' Opening Brief in Support of Motion for Judgement As a Matter of Law on Invalidity and Non-Infringement (with Exhibits 1-5), Apr. 4, 2005.
\**eSpeed, Inc. et al. v. Brokertec USA, L.L.C. et al.*, C.A. No. 03-612 (KAJ), Motion for Judgement As a Matter of Law on Invalidity and Non-Infringement, Apr. 4, 2005.
\**eSpeed, Inc. et al. v. Brokertec USA, L.L.C. et al.*, C.A. No. 03-612 (KAJ), Order, Apr. 4, 2005.
\**eSpeed, Inc. et al. v. Brokertec USA, L.L.C. et al.*, C.A. No. 03-612 (KAJ), Defendants' Proposed Findings of Fact and Conclusion of Law (with Exhibits 1 and 2), Apr. 4, 2005.
\**eSpeed, Inc. et al. v. Brokertec USA, L.L.C. et al.*, C.A. No. 03-612 (KAJ), Videotaped Deposition of Kenneth I. Ginsberg, Apr. 22, 2004.
\**eSpeed, Inc. et al. v. Brokertec USA, L.L.C. et al.*, C.A. No. 03-612 (KAJ), Brief in Opposition to Plaintiffs' Motion for Judgment As a Matter of Law or, in the Alternative, for a New Trial. May 23, 2005.
U.S. Appl. No. 09/553,423, filed Apr. 19, 2000, Fraser, et al.
U.S. Appl. No. 10/829,119, filed Apr. 20, 2004, Fraser, et al.
U.S. Appl. No. 11/947,231, filed Nov. 29, 2007, Fraser, et al.
U.S. Appl. No. 11/947,285, Nov. 29, 2007, Fraser, et al.
U.S. Appl. No. 11/947,347, Nov. 29, 2007, Fraser, et al.
U.S. Appl. No. 09/851,848, filed May 9, 2001, Gilbert et al.
U.S. Appl. No. 08/766,733, filed Dec. 13, 1996, Gilbert et al.
U.S. Appl. No. 09/859,661, filed May 17, 2001, Fraser, et al.
U.S. Appl. No. 11/760,580, filed Jun. 8, 2007, Fraser, et al.
U.S. Appl. No. 10/382,527, Mar. 7, 2003, Fraser, et al.
U.S. Appl. No. 09/216,464, filed Dec. 18, 1998, Lutnick, et al.
U.S. Appl. No. 09/294,526, filed Apr. 20, 1999, Fraser, et al.
U.S. Appl. No. 10/251,717, Sep. 20, 2002, Lutnick, et al.
U.S. Appl. No. 11/328,814, filed Jan. 9, 2006, Lutnick, et al.
U.S. Appl. No. 11/621,546, filed Jan. 9, 2007, Lutnick, et al.
U.S. Appl. No. 11/621,547, filed Jan. 9, 2007, Lutnick, et al.
U.S. Appl.No. 10/699,858, filed Oct. 31, 2003, Lutnick, et al.
U.S. Appl. No. 10/715,081, filed Nov. 17, 2003, Langridge.

(56) References Cited

OTHER PUBLICATIONS

U.S. Appl. No. 10/759,957, filed Jan. 16, 2004, Langridge.
U.S. Appl. No. 10/699,859, filed Oct. 31, 2003, Lutnick, et al.
U.S. Appl. No. 11/126,781, filed May 10, 2005, Lutnick et al.
U.S. Appl. No. 11/856,159, filed Sep. 17, 2007, Lutnick, et al.
U.S. Appl. No. 12/051,708, Mar. 19, 2008, Lutnick, et al.
Futures, "Guide to Computerized Trading 2003", vol. XXXII, No. 8, 2003; pp. 1-5.
U.S. PTO Office Action for U.S. Appl. No. 11/760,508; 16 pages; Apr. 13, 2010.
U.S. PTO Office Action for U.S. Appl. No. 11/947,231; 7 pages; Apr. 15, 2010.
Notice of Allowance for U.S. Appl. No. 11/215,236 dated Sep. 1, 2010; 7 pages.
Office Action for U.S. Appl. No. 11/215,236 dated Nov. 24, 2009; 15 pages.
Anderson et al.: Hedging with a put option, Texas Agricultural Extension Services, The Texas A&M University System, Jun. 1998, pp. 1-4.
Netessine, S.: Dynamic pricing of inventory/capacity with infrequent price changes, The Wharton School, University of Pennsylvania, Sep. 2003, pp. 1-32.
Decision for U.K. Application No. 0517644.1 dated Nov. 19, 2010; 17 pages.
Office Action for U.K. Application No. 0517644.1 dated Nov. 2, 2009; 5 pages.
USPTO Office Action for U.S. Appl. No. 09/859,661, Aug. 13, 2010; 11 pages.
Definition of "protocol", Merriam-Webster Online Dictionary, downloaded Aug. 11, 2010.
U.S. PTO Office Action for U.S. Appl. No. 12/335,951 dated Aug. 30, 2010; 4 pages.
U.S. Appl. No. 09/851,848, filed May 9, 2001; 17 pages.
Notice of Allowance for U.S. Appl. No. 09/851,848 dated Apr. 25, 2008; 7 pages.
PCT Search Report for PCT Application No. PCT/US02/14825 dated Feb. 25, 2003; 4 pages.
Notice of Allowance for U.S. Appl. No. 12/031,843 dated Sep. 17, 2010; 10 pages.
PCT International Preliminary Examination Report for Application No. PCT/US02/14825 dated Dec. 13, 2005; 4 pages.
UK Examiner Report for Application No. 0326273.0 dated Jul. 23, 2004; 3 pages.
UK Examiner Report for Application No. 0326273.0 dated Jul. 11, 2005; 7 pages.
Notice of Allowance for U.S. Appl. No. 11/947,231 dated Dec. 1, 2010; 8 pages.
Notice of Allowance for U.S. Appl. No. 11/947,347 dated Nov. 29, 2010; 12 pages.
"*Specialist* vs. *Saitori*: Market-Making in New York and Tokyo"; Lindsey, Richard R., Schaede, Ulrike. Financial Analysts Journal. Charlottesville: Jul./Aug. 1992. vol. 48, Iss. 4; p. 48, 10 pgs.
"Lowering exposure to counterparty failure;" Julio Bucatinsky. Wall Street & Technology. New York: Jul. 1998. vol. 16, Issue 7; p. 110, 3 pages.
"Price Quantity Strategic Market games"; Author(s): Pradeep Dubey; Econometrica, vol. 50, No. 1 (Jan. 1982), pp. 111-126.
Notice of Allowance for U.S. Appl. No. 11/215,236 dated Dec. 1, 2010; 7 pages.
Notice of Allowance for U.S. Appl. No. 11/215,236 dated Aug. 20, 2010; 8 pages.
U.S. PTO Office Action for U.S. Appl. No. 11/760,508; 19 pages; Dec. 21, 2010.
AU Examination Report for Application No. 2010200080 dated Nov. 23, 2010; 2 pages.
JP Office Action for JP Application No. 2000-590084; Mar. 17, 2011; 5 pages. (includes English Translation).
USPTO Office Action for U.S. Appl. No. 12/335,951, May 6, 2011; 5 pages.
Notice of Allowance for U.S. Appl. No. 11/947,231 dated Apr. 21, 2011; 6 pages.
Notice of Allowance for U.S. Appl. No. 11/215,236 dated Mar. 29, 2011; 25 pages.
Notice of Allowance for U.S. Appl. No. 11/947,347 dated Mar. 10, 2011; 13 pages.
Canadian Office Action for Application No. 2251259 dated May 3, 2010; 9 pages.
Canadian Office Action for Application No. 2354081 dated Jul. 2, 2009; 4 pages.
Brazilian Office Action for Application No. PI9916808-1 dated Feb. 1, 2011; 4 pages.
Canadian Office Action for Application No. 2493971 dated Apr. 7, 2009; 6 pages.
Canadian Office Action for Application No. 2371673 dated Feb. 12, 2010; 3 pages.
Chinese Office Action for Application No. 200510134147.0 dated May 9, 2011; 11 pages.
Notice of Allowance for U.S. Appl. No. 11/947,347; Jun. 27, 2011; 19 pages.
AU Examination Report for Application No. 2009238246 dated Jun. 1, 2011; 2 pages.
Brazilian Second Office Action for Application No. PI9916808-1 dated Aug. 18, 2011; 5 pages. (includes English Translation).
Decision on Appeal for PTO Office Action for U.S. Appl. No. 10/829,119; Oct. 11, 2011; 10 pages.
Record of Oral Hearing for U.S. Appl. No. 10/829,119; Nov. 3, 2011; 7 pages.
Notice of Allowance for U.S. Appl. No. 11/215,236 dated Nov. 14, 2011; 8 pages.
Notice of Allowance for U.S. Appl. No. 11/947,347 dated Nov. 1, 2011; 12 pages.
Notice of Allowance for U.S. Appl. No. 11/947,231 dated Nov. 23, 2011; 7 pages.
Notice of Allowance for U.S. Appl. No. 11/947,231 dated Nov. 28, 2011; 35 pages.
Notice of Allowance for U.S. Appl. No. 12/335,951 dated Dec. 1, 2011; 9 pages.
Notice of Allowance for U.S. Appl. No. 12/031,843 dated Nov. 15, 2011; 32 pages.
Notice of Panel Decision for U.S. Appl. No. 11/760,508; 2 pages; Jul. 20, 2011.
Korean Patent Office Action for Application No. 10-2001-7007716 dated Jun. 29, 2006; 24 pages.
Chinese Office Action for Application No. 200510134147.0 dated Dec. 6, 2011; 10 pages.
Notice of Allowance for U.S. Appl. No. 11/215,236; Mar. 2, 2012; 13 pages.
Notice of Allowance for U.S. Appl. No. 11/947,231 dated Mar. 8, 2012; 10 pages.
Canadian Office Action for Application No. 2493971 dated Feb. 21, 2012; 7 pages.
JP Office Action for JP Application No. 2000-590084; Mar. 2, 2012; 5 pages (includes English Translation).
U.S. PTO Notice of Allowance for U.S. Appl. No. 10/829,119; Mar. 19, 2012; 10 pages.
Notice of Allowance for U.S. Appl. No. 11/947,347 dated Feb. 8, 2012; 12 pages.
U.S. PTO Office Action for U.S. Appl. No. 10/382,527; 8 pages; Apr. 9, 2012.
Canadian Office Action for Application No. 2371673 dated Feb. 10, 2012; 2 pages.
Notice of Allowance for U.S. Appl. No. 10/382,527 dated Nov. 16, 2012; 5 pages.
U.S. PTO Notice of Allowance for U.S. Appl. No. 10/382,527; 6 pages; Dec. 1, 2009.
USPTO Office Action for U.S. Appl. No. 09/859,661; 11 pages; Sep. 6, 2012.
Zigas, David, "MSRB Rule Would Require Buyers To Accept Some Partial Deliveries" The Bond Buyer—May 16, 1983, Monday; p. 32.
JP Office Action for Application No. 2010-099296; 19 pages; Sep. 26, 2012.

(56) References Cited

OTHER PUBLICATIONS

U.S. PTO Office Action for U.S. Appl. No. 13/543,926; 19 pages; Aug. 2, 2012.
U.S. PTO Office Action for U.S. Appl. No. 13/555,273; 11 pages; Apr. 3, 2013.
U.S. PTO Office Action for U.S. Appl. No. 13/543,926; 20 pages; Apr. 9, 2013.
U.S. PTO Notice of Allowance for U.S. Appl. No. 10/382,527; 6 pages; May 2, 2013.
US Office Action U.S. Appl. No. 11/760,508; 8 pages; May 28, 2013.
CA Supplemental Analysis for CA App. No. 2,493,971; 32 pages; Jun. 28, 2013.
CA Examiner's Report for CA App. No. 2,354,081; 9 pages; Apr. 22, 2013.
CA Final Examiners Requisition for CA App. No. 2,251,259; 7 pages; May 23, 2013.
JP Office Action for JP App. No. 2011-205174; 2 pages; Feb. 4, 2013 (w/ English translation).
U.S. Appl. No. 13/550,011; 6 pages; Jul. 12, 2013.
U.S. Appl. No. 13/616,786; 6 pages; Jun. 13, 2013.
CA Examiner's Report for CA App. No. 2,371,673; 9 pages; Jun. 10, 2013.
U.S. PTO Notice of Allowance for U.S. Appl. No. 10/382,527; 6 pages; Aug. 23, 2013.
JP Office Action for JP App. No. 2012-12515; 7 pages; Jul. 24, 2013 (w/English translation).
JP Office Action for JP App. No. 2011-205174; 2 pages; Aug. 28, 2013.
CA Final Examiners Requisition for CA App. No. 2,251,259; 4 pages; Oct. 16, 2013.
JP Office Action for JP App. No. 2010-099296; 5 pages; Nov. 5, 2013 (w/English translation).
U.S. Appl. No. 13/550,011; 8 pages; Oct. 30, 2013.
US Notice of Allowance for U.S. Appl. No. 13/616,786; 6 pages; Oct. 30, 2013.
US Office Action U.S. Appl. No. 11/760,508; 10 pages; Dec. 3, 2013.
US Notice of Allowance for U.S. Appl. No. 10/3832,527; 11 pages; Dec. 11, 2013.
US Notice of Allowance for U.S. Appl. No. 12/031,843; 18 pages; Dec. 26, 2013.
US Notice of Allowance for U.S. Appl. No. 12/355,951; 5 pages; Jan. 15, 2014.
US Office Action for U.S. Appl. No. 11/947,347 dated Apr. 28, 2010; 10 pages.
CA Examination Report for App. No. 2,518,012; 4 pages; Feb. 5, 2014.
U.S. PTO Final Office Action for U.S. Appl. No. 13/555,273; 5 pages; Feb. 20, 2014.
US Notice of Allowance for U.S. Appl. No. 13/616,786; 8 pages; Feb. 24, 2014.
US Notice of Allowance for U.S. Appl. No. 10/3832,527; 6 pages; Apr. 8, 2014.
U.S. PTO Office Action for U.S. Appl. No. 13/543,926; May 16, 2014; 20 pages.
EP Office Action for App. No. 05255308.8; Feb. 11, 2014; 8 pages.
US Notice of Allowance for U.S. Appl. No. 11/760,508; 9 pages; Jun. 2, 2014.
JP Office Action for App. No. 2012-12515; 15 pages; May 15, 2014 (w/English translation).
US Final Office Action for U.S. Appl. No. 13/550,011; 8 pages; Jun. 3, 2014.
US Notice of Allowance for U.S. Appl. No. 13/616,786; 8 pages; Jun. 18, 2014.
AU Examination Report for App. No. 2013201198; Aug. 18, 2014; 3 pages.
AU Examination Report for App. No. 2012216355; Sep. 16, 2014; 3 pages.
*eSpeed, Inc v Brokertec USA, LLC* (79 USPQ 1258; 417 FSupp2d 580) (USDC DE, 2006) pp. 1259-1273.
*eSpeed, Inc v Brokertec USA, LLC* (82 USPQ2d 1183; 480 F3d 1129) (CAFC 2007) pp. 1184-1190.
CA Examiner's Requisition for App. No. 2,354,081; Mar. 20, 2015; 14 pages.
CA Examiner's Requisition for App. No. 2,852,742; Oct. 24, 2014; 3 pages.
JP Office Action for App. No. 2010-99296; Mar. 31, 2015; 5 pages (w/English translation).
JP Office Action for App. No. 2000-590084; Dec. 25, 2014; 9 pages (w/English translation).
JP Office Action for App. No. 2014-042926; Sep. 15, 2015; 2 pages.
CA Examiner's Requisition for App. No. 2,518,012; Apr. 9, 2015; 6 pages.
Bondweek, vol. XIII, No. 5, Feb. 8, 1993 at 8.
Advertisement in Bondweek, vol. XV, No. 4, Jan. 30, 1995, Starting Mar. 1, The Muni Bond Futures Contract will be an Even better trading Tool.
Advertisement in Bondweek, vol. XVII, No. 8, Mar. 3, 1997, CBOT Yield Curve Spreads Because a Lot can Happen in a Short Amount of Time.
Advertisement in Bondweek, vol. XVII, No. 17, May 5, 1997, The T-Bond. And Now the Bond Open Outcry Trading in the Worlds Two Largest Bond Contracts at the CBOT.
Levecq, Hughes et. al., "Electronic Trading Systems: Strategic Implications of market Design Choices," Stern School of Business, New York University, Mar. 3, 1995, pp. 1-28.

* cited by examiner

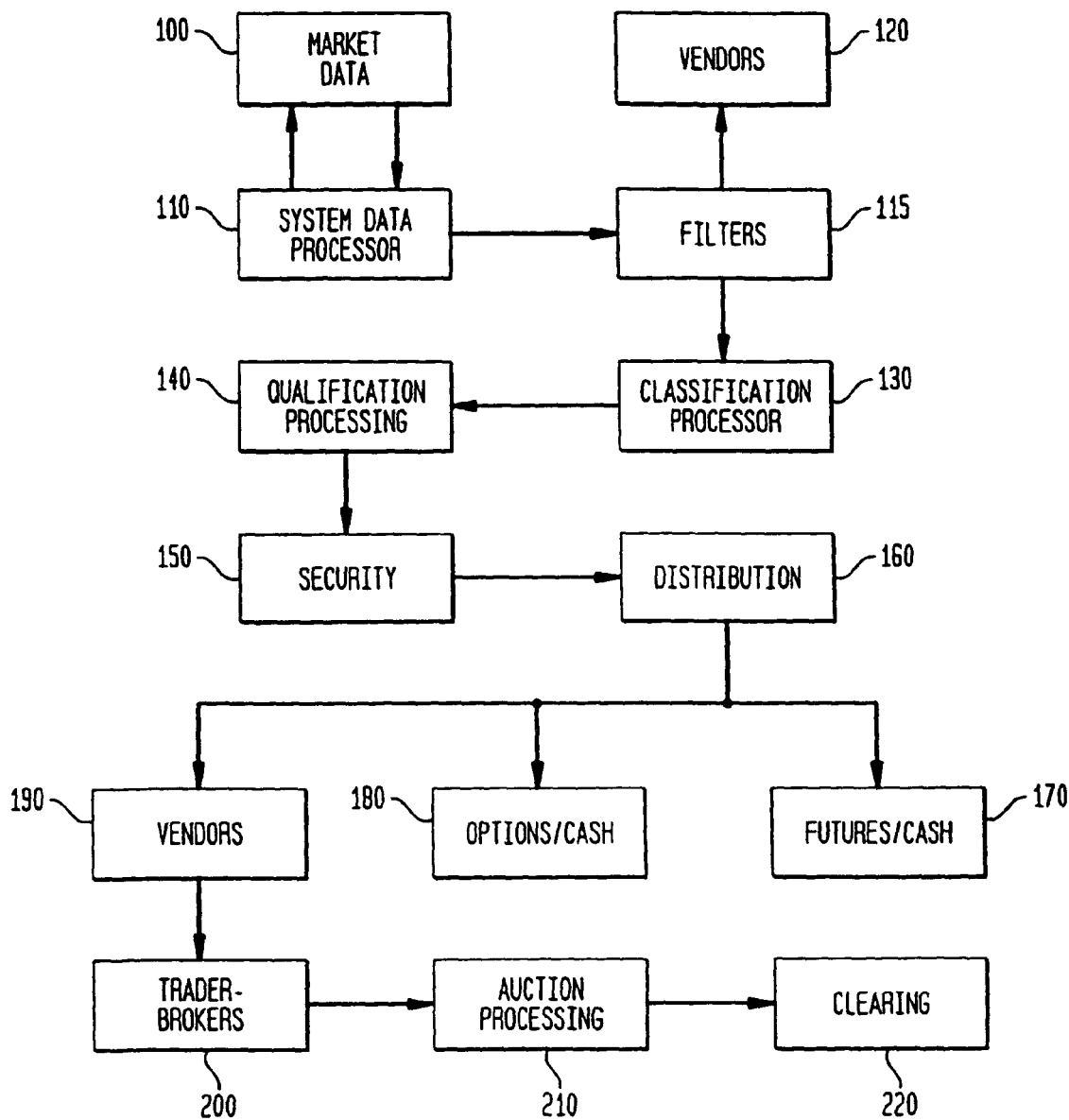

FIG. 12

DYNAMIC KEYBOARD FOR TRADING

CROSS REFERENCE TO RELATED APPLICATIONS

This is a continuation of U.S. patent application Ser. No. 10/251,717, filed Sep. 20, 2002, now U.S. Pat. No. 6,963,856, which is a continuation of U.S. patent application Ser. No. 09/216,464, filed Dec. 18, 1998, now U.S. Pat. No. 6,850,907, which is a continuation-in-part of U.S. patent application Ser. No. 08/766,733, filed Dec. 13, 1996, now U.S. Pat. No. 5,905,974, all of which are incorporated herein by reference.

BACKGROUND OF THE INVENTION

This invention relates to financial transaction data processing. More particularly, this invention relates to data processing systems and methods for managing the trading of select classes of assets including securities, financial instruments, commodities, and their derivatives in accordance with specific protocols in an auction format with controlled sequences of auction events.

Economic activity has at its centerpiece the buyer-seller transaction for goods and services produced and consumed in a market economy. It is the fundamental mechanism that allocates resources to producers and output to consumers. The operation of the buyer-seller mechanism is often a critical determinant of economic efficiency, and when operated properly, substantially enhances market performance.

Through history, many different approaches have been adopted to bring buyers and sellers together, each with the objective of having transactions occur at or very near the "market" price of goods, satisfying the desires of both buyers and sellers. By definition, the market price is the price that a fully educated market, given full access to that market, will transact select goods. Discovery of the market price can be accomplished by permitting full access to the transaction by substantially all potential buyers and sellers and allowing expression of each party's desires. However, the buyer-seller transaction should be structured to operate at very low costs—or it will distort the market price of goods with artificially high transaction costs. Thus, the two keys to effective buyer/seller transactions—full access coupled with low transaction costs—can be and often are conflicting, necessitating trade-offs between market knowledge and trading efficiency.

One well-known and particularly successful buyer-seller transaction system is known as the "open outcry auction." Buyers and sellers collect in one location and brokers present prices for select goods to the group via simple vocal offerings. While this approach has been used for almost all kinds of goods, it is particularly useful where there are no established trading locations or markets for the selected items. This approach is the dominant trading forum for exotic items such as rare pieces of art and the like. Although successful in bringing interested parties to the transaction, the overall process can be very expensive, adding significantly to market-distorting transaction costs.

Open outcry auction techniques, modified over time, have also found successful application in many trading activities, including the buying and selling of farm produce and livestock, commodities contracts, futures contracts on various items, and fixed income securities. Many of these trading activities focus on the buying and selling of essentially fungible items; that is, items without meaningful differences from like items on the market. For example, the price of a bushel of wheat for February delivery is usually independent of its source. Similarly, a 30-year U.S. treasury bond paying a coupon rate of 6.75% and having an August 1996 issue date is indistinguishable from an identical bond owned by another investor. Accordingly, the price at which buyers are willing to pay and sellers are willing to accept defines the market price of all 30-year U.S. treasury bonds of that same vintage, allowing open outcry auction trading without regard to an item's source.

(For clarity, the following description focuses mainly on fixed income securities, which should in no way be construed as limiting the scope or applicability of the invention.)

Fixed income securities issued by the United States government are known as U.S. treasuries. These instruments typically span maturities of 13 to 52 weeks (T-bills), one to ten years (notes), and up to 30 years (Bonds). T-Bills are pure discount securities having no coupons. Almost all other treasuries having longer terms are coupon notes or bonds, with defined semi-annual interest payments to the holder. An additional and more recent type of treasury security provides for inflation indexed payments.

New treasury securities are auctioned by the U.S. government at preestablished auction dates. The auction prices for newly issued treasuries having a face value with a set coupon rate defines the treasuries' yields when issued. After the auction, the treasuries enter the secondary market and are traded typically "over the counter" (i.e., without a defined exchange). As inflation expectations and supply and demand conditions change, the prices of recently auctioned treasuries fluctuate on the secondary market. The new prices reflect competing bid and offer prices communicated among institutions, banks, brokers, and dealers in the secondary market.

The newly auctioned securities are traded with securities that issued in earlier auctions. Some securities are traded more often than others and are called the "actives." The actives usually correspond to the recently issued securities as opposed to the older securities. Indeed, some older securities are infrequently traded, resulting in an illiquid market that may or may not reflect the market-determined interest rate for the more current securities having the same maturity as the older securities.

Accordingly, the very size and diversity of the treasury market requires a high level of sophistication by market participants involved in the bidding, offering, buying, and selling of these securities. The very complexity associated with the transaction and the scale of trading undertaken by banks, brokers, dealers, and institutional participants necessitates a rigidly structured approach to trading.

In the past, open outcry auction bond brokering served its customers well, providing efficient execution at nearly accurate market pricing. The open outcry auction as applied to bond trading was implemented by a broker working with a collection of customers to create and manage a market. Typically, customer representatives—for both buyers and sellers—would congregate at a common location (e.g., a single room) and communicate with each other to develop pricing and confirm transactions. This process involved representatives expressing various bid and offer prices for a fixed income security at select volumes (which are expressed in millions of dollar at given maturities). This expression took the form of a loud oral "cry" of a proposed bid or offer and the coordination with fellow representatives regarding the extraction of complimentary positions until a transaction match was made and a deal done. This "trade capture" process relied on after-the-fact reporting of what just transpired during the oral outcry trade.

Recently, the trade capture process was performed by clerks who input data into electronic input devices. A clerk would interpret the open outcry of many individual brokers simultaneously, who were verbally making known the trading instructions of their customers. The quality of the data capture was a function of the interpretive skill of the clerk and the volume and volatility of customer orders. A significant drawback of this type of auction data capture process is the difficulty in accurately discerning each trading instruction as verbalized in rapid succession during a quickly moving market.

Many permutations of this process are known. In general, because of the lower volumes of transactions occurring at the time of its development, and the lack of suitable alternatives, the open outcry auction process remained the dominant trading mechanism for decades. However successful, this process is not perfect. Indeed, in recent years, some of the problems in an open outcry auction forum have been amplified by the vastly increased level of trading now undertaken in the fixed income field. Generally, difficulties in the open outcry auction process can occur as a result of trader personalities. For example, a loud, highly vocal representative may in fact dominate trading and transaction flow—even though the representative may only represent a smaller and less critical collection of customers. Although such aggressive actions at an open outcry auction may be beneficial to those customers in the short run, overall, such trading dominance can and will likely distort pricing away from the actual market and leave some buyers and sellers unsatisfied.

Other problems exist in open outcry auctions that retard efficient trading. The speed at which trading flows and the oral nature of the auction process create a potential for human error that often translates into many millions of dollars committed to trades unrelated to customer objectives. On some occasions, the broker is left at the end of each trading day with a reconciliation process that may, under certain market conditions, wipe out all associated profit from that day's trading. Also, customers may quickly change trading direction based on new information available to the market. Shifting position or backing out of a previously committed transaction on very short notice is often very difficult in the traditional open outcry process.

There have been many efforts to incorporate computers into trading of select assets and financial instruments, including efforts to automate the auction process through systems that control auction protocols. Indeed, almost all trading today involves some computer support, from simple information delivery to sophisticated trading systems that automate transactions at select criteria. However, these systems have not significantly impacted the issues presented herein relating to satisfaction of buyers' and sellers' complex desires in completing transactions in open outcry auctions and traditional fixed income trading.

In view of the foregoing, it would be desirable to provide apparatus and methods that address the aforementioned problems of certain trading processes involving buyers and sellers.

SUMMARY OF THE INVENTION

It is an object of this invention to provide a data processing system that supports a high volume trading system.

It is also an object of this invention to provide a data processing method that supports a transaction enabling process for trading securities at accelerated levels with few errors and low costs.

It is further an object of this invention to provide a data processing system that supports a formalized trading protocol governing the control of trading on a bid/offer market.

It is still further an object of this invention to provide a system that in real time collects, displays, and distributes information on current securities market activity and that in real time processes this information to quantify the scope of order and trading activity of participants.

It is yet further an object of this invention to provide apparatus for the select processing of several types of data that are qualified prior to use and for translating the qualified data into order and trading states for fixed income securities.

It is another object of this invention to provide a data processing system that has controlled access to trading commands pursuant to pre-established interactive criteria, rather than traditional bidding, offering, and trading criteria.

It is also another object of this invention to provide a computer system that includes multiple workstations linked by high speed communication paths to rapidly distribute and exchange market data to participants.

It is further another object of this invention to provide a system that grants priorities and rewards to participants who create liquidity while insuring that participants' orders are satisfied in an orderly and equitable fashion.

It is still another object of this invention to encourage buyers and sellers to reveal their total buy and sell intentions through commencement of a trading action that improves price execution.

It is yet another object of this invention to quantify price improvement trading incentives of buyers and sellers and bidders and offerors.

It is another object of this invention to distribute price improvement trading incentives to buyers and sellers.

It is yet another object of this invention to provide a database system linked to a price improvement protocol processor for collecting, filtering, and distributing select market data in real time.

It is another object of this invention to provide a computer system having dedicated workstation input devices customized for trading by participants at workstations that can each be further customized to the particular trading patterns of a given participant.

It is still another object of this invention to provide customized trading tools particular to a given participant, such as price improvement orders, stop and limit orders, contingent orders, and flag warnings (e.g., that a particular trading limit, margin limit, trade initiation limit, or the like has been reached).

The above and other objects of the invention are provided by a computer-based, data processing system having program controlled logic for managing select trading. The data processing system employs a plurality of trading workstations linked to a server for coordinated data flow and processing. Communication is provided by a network, such as, for example, an Ethernet, token ring, token bus, or other hierarchical LAN and/or WAN configuration. The system preferably includes a dedicated keypad for input at each workstation that provides individually programmed keystroke commands; alternatively, other keyboards, keypads, or voice controlled electronic devices can be used with the system. Central processing logic dictates the available order, trading and allocation options, and screen displays for each workstation. As orders and transactions are entered, various protocols affect the allocation of bid-offer control, priority generation, exclusive trading time, and interactive trade management. As trades are completed, the system updates a linked database with newly entered transactional data.

In accordance with this invention, the controlling logic provides a sequence of trading states for each participant. The five states are:

1. Bid-Offer State
2. When State
3. Workup State
4. Second Look State
5. Workdown State As various transactions are entered, workstations operate in one of these five states. The workstation "state" determines the options available to the participant—and thus controls the flow of orders and trades in a cost-efficient and substantially error-free manner. While participants may bid, offer, and trade on differently configured workstations, the protocols are universal for all participants, thus precluding aggressive control of transactions without true capital commitment.

Note that although the invention is described herein in terms of a fixed-income financial-instruments auction that fairly and quickly transacts bid-offer trading while providing trading incentives, the invention is not limited to such fixed-income instruments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 2 is a diagram of trade-data transmission according to the invention;

FIG. 12 is a drawing of an interactive keyboard according to the invention.

DETAILED DESCRIPTION OF THE INVENTION

Figure 1:
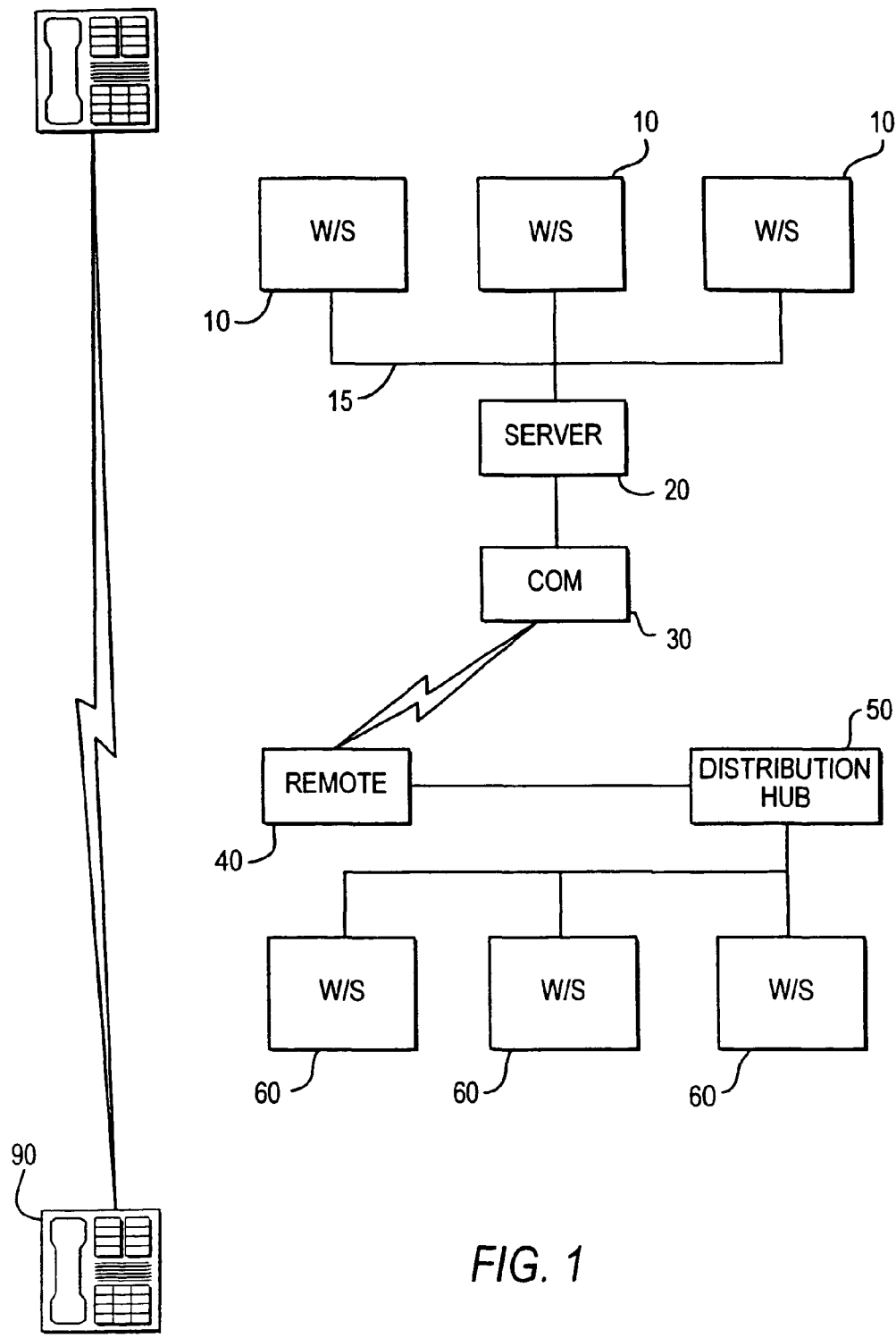
FIG. 1 is a system block diagram according to the invention.

The invention is directed to data processing systems and methods for implementing complex trading rules in support of select transactions. One aspect of the invention relates to a hardware arrangement that provides a specifically tailored platform for processor enhanced trading. This hardware arrangement encompasses a plurality of custom designed workstations linked together. Each workstation communicates to a central server that orchestrates the trading process in accordance with program controlled logic. The workstation includes a display for presenting the particulars of trading activity. Preferably, a customized keypad permits either enhanced data/trade entry by a participant or selection of an input interface by a participant.

Another aspect of the invention is the governing logic for controlling system dynamics. This logic is stored in system memory and provides the sequence of protocols and rules that allocate trading priority. The logic also provides system responses to operative commands entered by participants at the workstations either directly or via brokers or terminal operators. The system logic is important in two ways. First, it provides the guiding principles underlying the system, and thus, performance is tied directly thereto. Second, when system logic (known as the rules dictating market access and response) is understood by participants—it places participants on as close to an equal footing as possible. The system preferably provides all registered participants with fair and complete access to the trading process.

Although the examples herein focus on fixed income instruments and the trading of these instruments in large volumes—with the volume of a given transaction represented in, but not limited to, dollars (e.g., $25 million of 10 year treasuries)—the invention is not limited to them.

Each term listed below is used herein in accordance with its associated definition:

| | |
|---|---|
| Issue | A common class of fixed income security (e.g., the most recently issued 10-year treasury) |
| Bid | Dollar or yield amount at which to buy a security/Issue |
| Offer | Dollar or yield amount at which to sell a security/Issue |
| Spread | Difference between best Bid(s) and best Offer(s) |
| Size | The volume in dollars of a particular Bid/Offer |
| Hit | Accepting a pending Bid |
| Take or Lift | Accepting a pending Offer |
| Trade | A string of transactions at one or more prices initiated by a Hit or Take and continuing until timed out or done |
| Participant | A person or controlling entity receiving data on trading and responding thereto. While the Participant is often a Trader, terminal operator, or broker acting on behalf of a customer, this is not the only arrangement. For example, customers may directly interact as Participants. Other arrangements are also possible |
| Makers | Participants with pending Bids and Offers (those who "make" a market) |
| Uncleared Entry | Current Bids/Offers that only a Maker can Hit or Take |
| Aggressor | A Participant who initiates a Trade |
| Traders | After a Trade is initiated, all Participants involved in the transaction (i.e., buyers and sellers) |
| Active Side | Group of Traders on the same side of the market as the Aggressor |
| Passive Side | Group of Traders on opposite side of the market from the Aggressor |
| Exclusive Time | A time period commenced by a trading action during which the first best bidder/offeror has the opportunity to trade more |
| Price Improvement Hit | An accepted sell order at and/or below the current best Bid to sell a security/Issue initially for more volume than shown on the Passive Side |

-continued

| | |
|---|---|
| Price Improvement Take | An accepted buy order at and/or above the current best Offer to buy a security/Issue initially for more volume than shown on the Passive Side |
| Trader Surplus | When an Aggressor has traded the entire size shown on the Passive, Side at one or more price levels and is showing intent to trade more, or when a passive Participant is willing to buy or sell above or below the current trading price. These situations can lead to a Price Improvement Trade between Aggressors and passive Participants. |

System operation is based on the repetition of several functions, which in one embodiment of the invention are implemented through a specially designed keypad or other input means. Generally, the process begins when Participants enter Bids and Offers for a defined class of instruments. These orders are shown on a display screen in specific ways to reflect priority, size, and kind. A Participant can establish trading priority by placing a Bid or Offer at a select price and volume; Bids at the same price are displayed on the screen in the order in which they enter the system (i.e., time order); similarly, Offers at the same price are displayed on the screen in time order. As such, a "queue" of Bids and Offers develops with line placement for the same price set by time order. Alternatively, the queue can be set by a different metric, such as, for example, a combination of time and volume. The queue (or a summary thereof) is displayed at the Participant's workstation. Typically, there is a small difference between Bid and Offer prices (the "Spread"). If no difference exists, a "locked" market occurs.

Importantly, Bids and Offers are commitments—once placed, a Bid can be "Hit" and an Offer can be "Taken" or "Lifted" by a Participant willing to trade the instrument at the set price or set of prices.

To control trading between many Participants, a level of hierarchy is set. A Participant who Hits a Bid or Lifts an Offer is promoted to a new level known as the "Aggressor." By acting on a Bid or Offer, the Aggressor defines (and thus establishes) the Active Side of the Trade. For example, when a Participant hits a Bid, selling becomes the Active Side of the Trade and buying turns passive. However, when a Participant takes an Offer, buying is active. This can be important because according to some conventions, the Active Side pays commissions on the ensuing transactions. When a Price Improvement Trade takes place, however, the commission on this Trade can be divided among the Participants in the Trade. This allocation of commissions is premised on the notion that the active Participants are taking advantage of liquidity—while the Passive Side is supplying liquidity to the market, and on the notion that if a better price can be obtained during Price Improvement trading, a passive Trader is provided with value for which that Trader is willing to pay. Further combinations of commission allocation are preferable in order to encourage trading (e.g., choices among volume discounts, annual fixed fees, both sides paying, and paying based on time and place of execution).

For controlled implementation, the distinction between Active and Passive Sides is important and carries more significance in processing transactions than the Bid and Offer sides of a transaction.

Focusing further on the nomenclature for system logic, a "Trade" is considered a sequence of trading events, triggered by an initial Hit or Take that defines the Aggressor. A Trade continues for all such transactions until the Trade "clears." During a non-price improvement Trade, the Aggressor side remains active and all transactions take place at the price set by the initial Hit or Take—regardless of the number of transactions that follow. To properly track activity, a Trade generates a (virtual and/or real) single trade ticket—with an associated and screen-displayed reference number. When a transaction reflects more than a single buy/sell, several trade tickets each reflecting the total size transacted per Participant per side is recorded. A set of average price tickets or their equivalent may be generated.

In addition, the system preferably controls a Participant's maximum command size, thus preventing the Participant from entering orders that are outside the Participant's permissible trading parameters. The system preferably also protects the novice Participant. Accordingly, Participants with different skills can trade on a more level playing field. The system can preferably further control the hierarchy of Participants to allow management intervention.

FIG. 1 shows various hardware components of an embodiment of a system according to the invention. A plurality of workstations 10 are each individually linked to a central server 20 via network lines 15. Server 20 includes controlling software that manages data flow to individual workstations 10 in accordance with system constraints. The system can be linked to Participants at remote locations either directly, indirectly, and/or through the Internet. Access to trading activity is accomplished at communication server 30 and remote server 40, which is coupled to a remote distribution hub 50 and remote workstations 60. Supplemental communication lines are provided via conventional phone link 90. This platform further includes a 32-bit operating system that manages the multi-tasking environment within the network. The invention can be implemented using an open VMS 64-bit operating system running on DEC Alpha clustered servers; however, other operating systems may be substituted. Alternatively, the desktop client machines can be implemented in OS/2 (Windows N/T 4.0 is a migration substitute). The workstation provides display and input and can be selected from Pentium© processor-based PCs, SPARC Stations® (using UNIX), or other hardware and software systems and/or languages providing the requisite functionality.

FIG. 2 shows various information paths of the invention. Market information is derived from the auction process and is a highly valuable source of data to related markets, futures and options, or cash as the case may be. Market data 100 is collected from the plurality of online terminals operated by Participants within the relevant market sector. A continual exchange of information flows between Participants (included in market data 100) as Bids, Offers, and Trades are transacted in real time. This information is collected by the system proprietor and entered into a system data processor database 110.

Online market data is then transferred to a data filter and enhancer module 115, which clarifies and articulates the continuous incoming market data for use, e.g., by data accumulators and vendors 120. One aspect of the data enhancer operation is conversion of online trading information into digital form for transmission to a classification processor 130. Classification processor 130 creates a data set in an appropriate format for further manipulation, which includes generation of a coordination array of data in matrix format.

Once appropriately formatted, the online market data is then transmitted to a qualification processor 140 for determination of a real time command selection. The qualification processor also provides both Participant validation and credit limit approval with Participant and security type linkages among Participant relationships and security identifiers. The information is unloaded into a security database 150, and then passed to a distribution processor 160.

The foregoing operation results in real time distribution among Participant workstations via communication lines and screen displays for decision execution and for select distribution within the fixed income investment community. In one embodiment of the invention, three segments of this community are provided with the data. At options/cash 180 and futures/cash 170, system proprietors involved in automated options and futures processing are provided the cash market data for quantifying and evaluating specific options and futures positions pursuant to the trading of option and futures contracts on specifically identified securities, including indices and notional securities derived therefrom. In a similar manner, the securities data is provided to system proprietors regarding options and futures contracts to permit proper transactions in the trading of options and futures contracts based on the identified securities data.

In the present context, data relating to the auctioning of cash market securities is used to support trading in their derivative markets. Likewise, if the context were the auctioning of derivative securities, distribution flow would be to support trading in the underlying security.

The third channel of distribution for the securities is to data accumulators and vendors 190. This is followed by the continual distribution of securities data to Participants within the investment and trading community 200, to auction processing 210 in support of automated trading, and finally to clearing 220 in support of declaring and reporting functions associated with such trading, including clearance operators among others.

Trading activity is highly fluid and fast paced. Accordingly, efficient input systems enable Participants to quickly enter one of typically several trading choices available. Input systems can be enhanced by a highly specialized keypad that permits higher trading efficiency. Accordingly, another aspect of the invention are the unique keypads shown in FIGS. 3A-B.

During processing, various "states" exist depending on the type of inputs received by the system. The core Bid-Offer state reflects the open status of the market. In this state, Participants are referred to as "Makers" and "contra-makers;" during other states, Participants are considered "Traders" and "contra-traders." Traders and Makers are Participants who issue a trading command, while contra-makers and contra-traders are those who receive a trading command. Some Participants, e.g., a first buyer or first seller, in the Workup State are known as "current workers" and are vested with the authority under system logic to control a Trade for a predetermined amount of time. Depending on the fixed income security or instrument, this amount of time may be zero. Important character distinctions among Participants at various stages of trade processing are displayed on screen by reverse highlight or similar display attribute.

Figure 4:
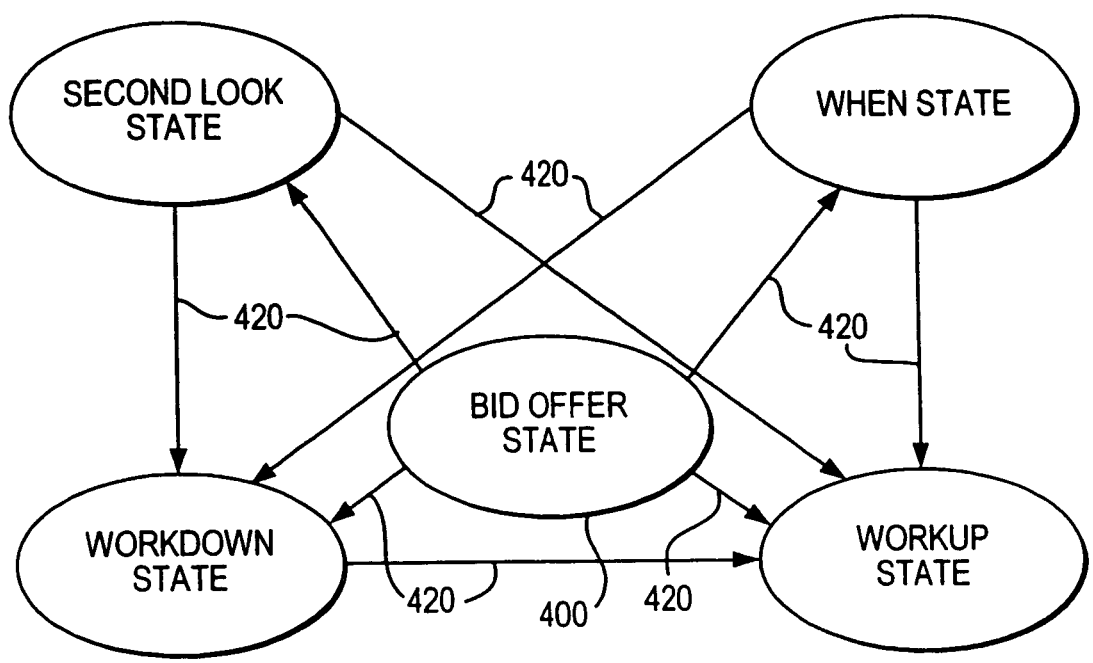
FIG. 4 is a diagram of various system states according to the invention.

The interrelationship of these five system states is shown in FIG. 4. Initial trading is always predicated on Bid-Offer State 400, with sequence process 420 assessing system inputs to determine state changes. As inputs are entered, a state change is triggered and processing shifts to paradigms associated with each of the five states. As each state is entered, the protocols are shifted and new trading rules apply.

Information about Participants and trading progress are provided at each workstation in the form of a selectively configured screen display. In particular, the system provides for screen display in the form of a trading quadrant or "quad" wherein key trading indicators are displayed. A sample QUAD is shown below:

| QUAD 1 | | | | | |
|---|---|---|---|---|---|
| 100.01 CUST | BID | 2 BOT | 100.03 CUST | OFFER | 15 SOLD |
| 2001 | 1 | 0 | 2007 | 5 | 0 |
| 2002 | 1 | 0 | 2006 | 10 | 0 |
| TOTAL | 2 | 0 | | 15 | 0 |

In QUAD 1, the current bid price is "100.01" (100 plus ¹⁄₃₂nd). Continuing across on the same line, the current Offer price is "100.03"—indicating a Spread of 0.02 (²⁄₃₂nds). When a Trade is in progress—as initiated by a Hit or Take from the Bid-Offer State, the Participant's attention is directed mainly to the conditional prompt showing the total size being bid or offered and that can be acted upon by the Participants. This number is displayed at the intersection of the TOTALs line and one of the Bid-Offer columns (i.e., the 2 or 15). This total is further defined in the quad into individual prequantities, indicating the Participant sizes in their respective rows (e.g., CUST 2006's size of 10). Other QUADS or arrangements can be under Participant or logic control to display trading state information.

Above the BOT and SOLD captions in QUAD 1, a second totals counter provides the Makers total size. In the Bid-Offer State, this total is the same as the conditional prompt because no Trades have been executed. This changes after the first transaction when a "Traders list" is created—and the conditional prompt tracks the Traders' total, while the Makers' total keeps track of quantity left in the Makers' list.

Figure 5:
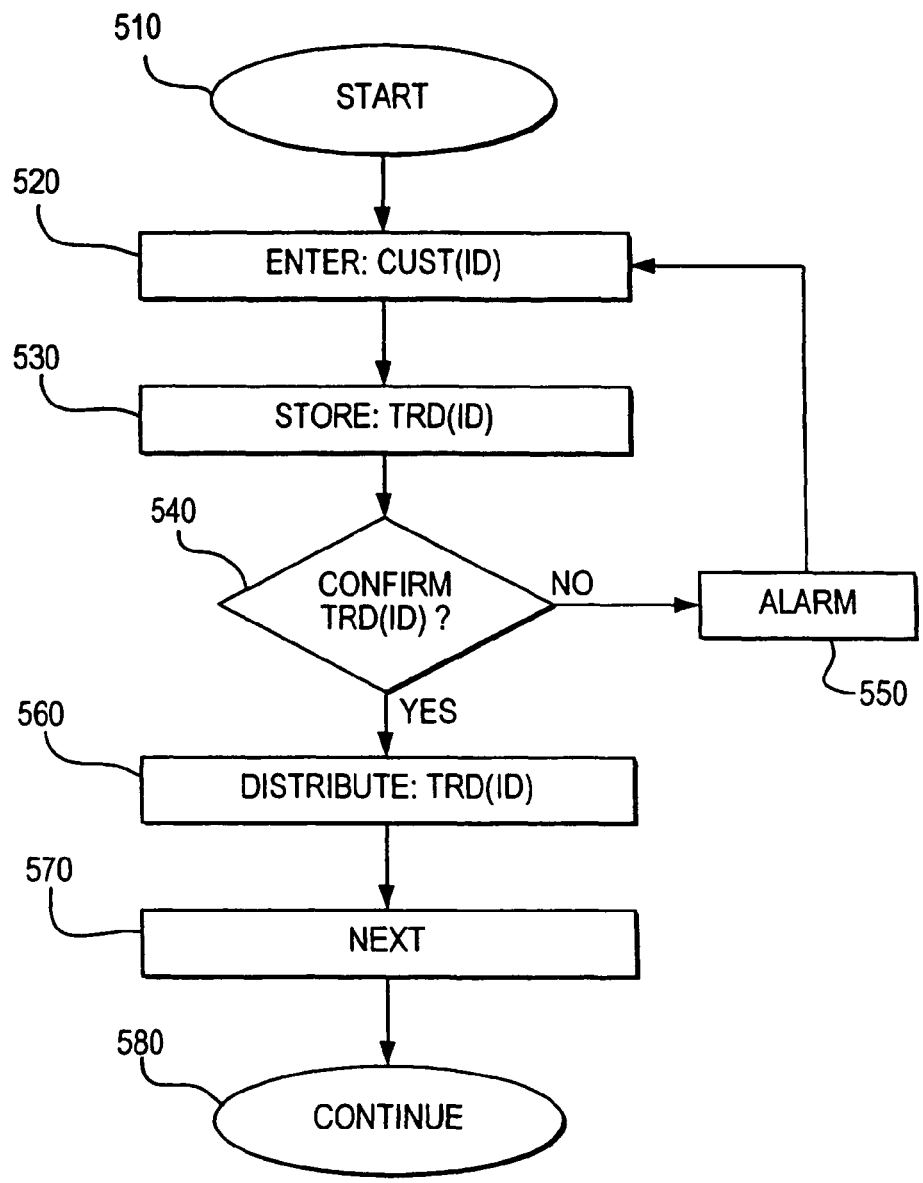
FIG. 5 is a logic diagram of trade-data input according to the invention.

Data selected for display on the QUAD is processed in accordance with logic shown in FIG. 5 according to the invention. The system enters a new Participant CUST(ID) (e.g., "2001") at 520 and stores this in memory with associated trade data/command TRD(ID) at 530. The trading command is confirmed at a system level, wherein system errors are rejected via alarm 550. Once confirmed, the new data/command TRD(ID) is distributed at 560 to screen buffers for display of the associated work status. This is repeated for each new entry at 570.

The following discussion now focuses on the Bid-Offer state, wherein market Makers are inputting various Bids and Offers into the system while waiting for an execution as the market matures. The best first bidders and offerors receive trading priorities during clearing and Exclusive Time. These pending commitments may be acted upon via Hit or Take commands by Makers currently showing or by a third party without showing its position prior to the Hit (or Take). As new Bids and Offers are made, the associated prices determine the placement in the queue, with equally priced Offers (or Bids) placed in time order. Accordingly, as the market tightens with better Bids and Offers (reducing the Spread), these new positions are moved to the top of the displayed queue.

In addition to price, Bids, and Offers, a size component is included, which is used to express the dollar volume of the pending Bid (or Offer). For a Participant to increase the size of the Bid or Offer, a new entry is made and placed in the queue separately, because the system preferably does not increment the size component—unless the entry was made adjacent in time to an existing Bid/Offer already in the queue. Alternatively, the sizes could be combined as follows: as Bids and Offers are entered during the Bid-Offer state, they are displayed in relation to their respective size, with the total Bid-Offer count (aggregate size) displayed at the noted conditional prompt. As such, the conditional prompt serves as the main impetus for a transaction because of its measure of apparent market capacity at a given price.

A Bid/Offer is typically (but not always) entered as "uncleared" during the Bid-Offer state—indicating that the Bid or Offer is only available to the first best market Participant (shown at the top of the first queue). Accordingly, uncleared presentations can be acted on by only this Participant for a system-set time interval—that is, only this Participant can Hit or Take these uncleared entries. After the preset time interval has run (tracked by a system internal clock), the uncleared Bids/Offers—if still extant—become available beyond the best price Participant. Also, for certain securities, the preset time interval may be zero. More often, a known interval is established. There is a business purpose for this arrangement. By giving Participants with active Bids/Offers the first chance for the new entry, these Participants are rewarded for showing the market on their side. Thus, the initial bidders/offerors are invited to become Aggressors—and the system preset interval provides these bidders/offerors with time to make their decision by preventing new buyers and sellers from entering the Trade (i.e., hitting or taking) for this discrete time interval.

Figure 6:
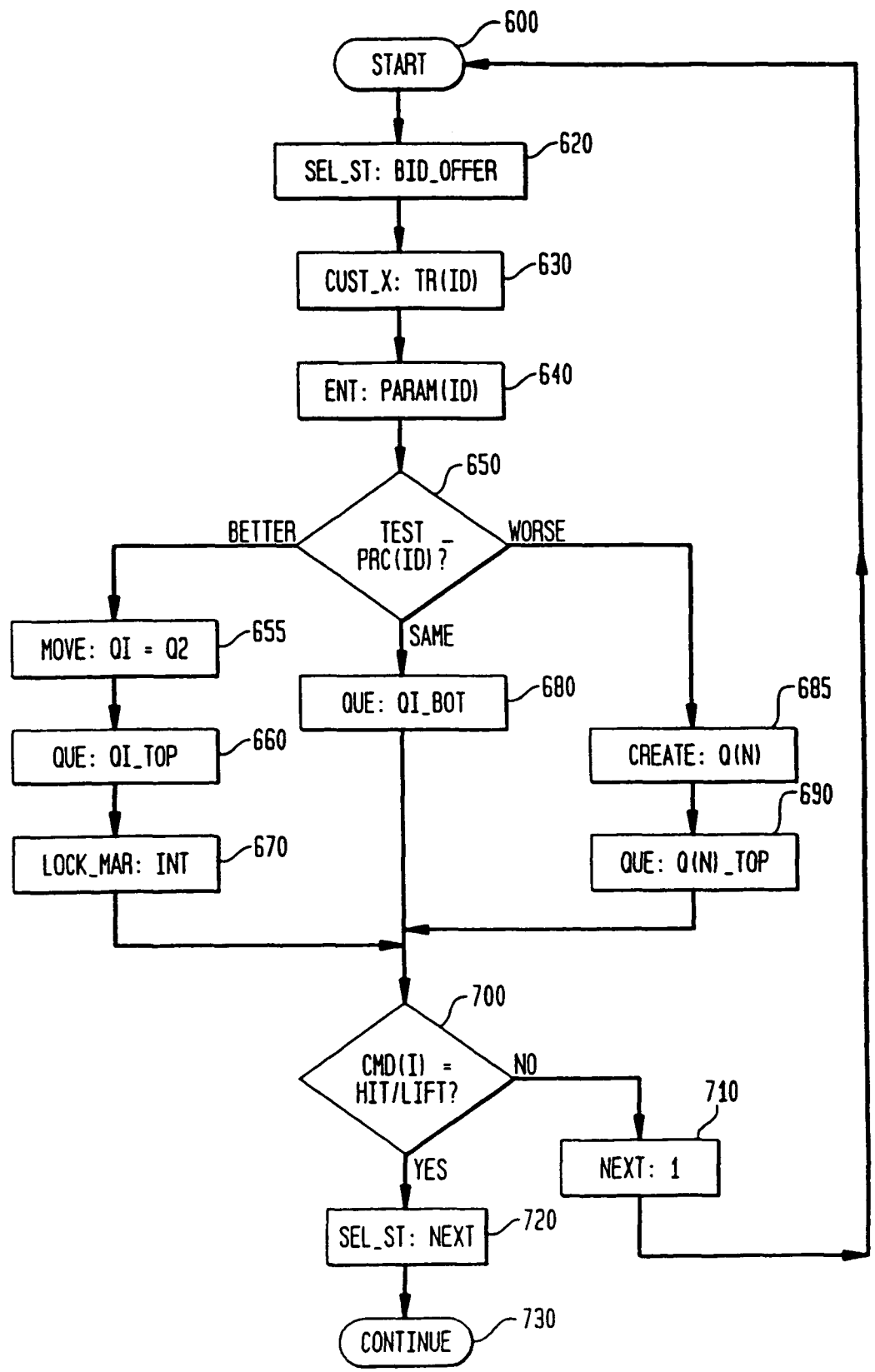
FIG. 6 is a logic diagram of a Bid-Offer State according to the invention.

System logic associated with the Bid-Offer state is shown in FIG. 6. Logic begins at 600 with a new data/command entry. A state selector qualifies the state as Bid-Offer at 620. At 630, a CUST X profile is taken from the new entry and all associated data is passed into a parameter string which is entered at 640.

The system compares the new price entry, PRC(I) entered into the system at test 650, with pending Bids (or Offers if PRC(I) is associated with an Offer). Test 650 results in one of three outcomes: first, if the new entry PRC(I) is better than the current market, logic branches to 655 and the previous top tier queue, Q1, is demoted (moved) to Q2. The new entry then forms the first line in the new top queue, Q1_TOP, at 660. This allows the system to create multiple queues at select price points for each side of the market. The multi-queue environment permits "Price Improvement" trading, described in detail below.

The second outcome of test 650 occurs if the new entry is out of the market (i.e., "worse" than the best current Bid/Offer). Logic then branches to 685 and a new queue, Q(N), is created. The new queue, having a price point worse than the market leaders, is displayed below the top queue. At 690, the new entry is placed at the top of the new queue, Q(N)_TOP.

As more entries are input, the system assesses each and places them in the multiple queues in accordance with price, and within each queue in accordance with time priority. This results in several price defined queues for each side of the market and allows for Price Improvement trading if and when a new Aggressor Takes/Hits all showing volume for one and up to all shown contra-queues.

The third outcome of test 650 is a qualified price, which leads to 680. This entry is placed at the bottom of Q1 because of time priority.

At test 700, the system checks for a new Hit/Take; if none, logic continues at 710 to the next entry. A positive response to test 700 shifts processing to the next state at 720.

The screen display changes according to the various entries into the bidding process. In QUAD 2 below, Participant CUSTs 3001-3003 on the BID side reflect a market of 27 million (see conditional prompt "27" on the TOTALs line). This includes a first bid by Participant CUST 3001 of 5.0 million, followed a little later by a second bid of 20 million. In this example, Participant CUST 3007 (e.g., a bank or other institutional Participant) enters the picture with an uncleared Offer of 10 million (the asterisk indicates the Offer is uncleared); this is the 10 million shown on the conditional prompt line on the Offer side. As such, controlling logic gives the original Makers the first chance at the new Offer by CUST 3007. After the preset interval, the market is again opened and the asterisk is removed.

| QUAD 2 | | | | | |
|---|---|---|---|---|---|
| >7.625.225 108.04 | | 27 | TZ *108.04 | 10 | |
| CUST | BID | BOT | CUST | OFFER | SOLD |
| 3001 | 5 | 0 | 3007 | 10 | 0 |
| 3002 | 1 | 0 | | | |
| 3003 | 1 | 0 | | | |
| 3001 | 20 | 0 | | | |
| TOTAL | 27 | 0 | | 10 | 0 |

The When State is triggered by a trading command against an uncleared Bid/Offer by an Aggressor who is not the first best original Maker. However, system control does not allow this trading command by the new Aggressor to be instantaneously executed. In accordance with system logic, the trading processor creates a time interval or delay, and thus provides the first best original Maker with time to assess the new situation created by the Aggressor and then respond, if desired, to the uncleared entry on the Passive Side.

In particular, as noted above, the uncleared status exists for a defined interval—controlled by a computer driven timer. Only during this time interval does a When State occur, which then only lasts until resolved either by action on the part of the first best original Maker on the Active Side or by expiration of the interval timer.

During When State processing, the system displays the original Makers—existing with Bid/Offers outstanding prior to the entry of the new Aggressor—and the new Traders, who enter via Hit or Take commands on the pending uncleared Bid/Offer. These Makers and Traders are clearly separated on the screen (see QUAD 3B below). Importantly, these original Makers are given the opportunity to trade at the new price point established by the Aggressor; multiple Makers from the original list will each have an opportunity to take the new price in the order of their priority in the queue. The system increments through each Maker. If one issues a buy/sell order at their size, they become the Aggressor. When this occurs, the logic departs the When State and can either enter the Workup State or Workdown State depending on whether the new Aggressor takes the entire volume indicated at the conditional prompt.

Once When State processing has been initiated, no trade entries from the Passive Side are permitted. Furthermore, Participants are blocked from entering on the Active Side. Specifically, entries on the uncleared (active) side will come from new Traders, extant Traders, or the original Makers. If, for example, a Trader has 10 offered and 5 are traded, the Trader preferably can cancel the amount which is not yet committed during the When State.

However, if the second interval timer expires without any intercession by the original Makers, the When entries (one or several) will automatically trade—and the original Makers will not take part in this Trade. During the time-controlled interval, WTAK flashes on screen to the Makers showing a Trade on the uncleared Offer. WHIT will flash for a Hit on an uncleared Bid. During this interval, the size entries for pending Makers are all initialized to zero and are no longer presented at the conditional prompt.

Figure 7:
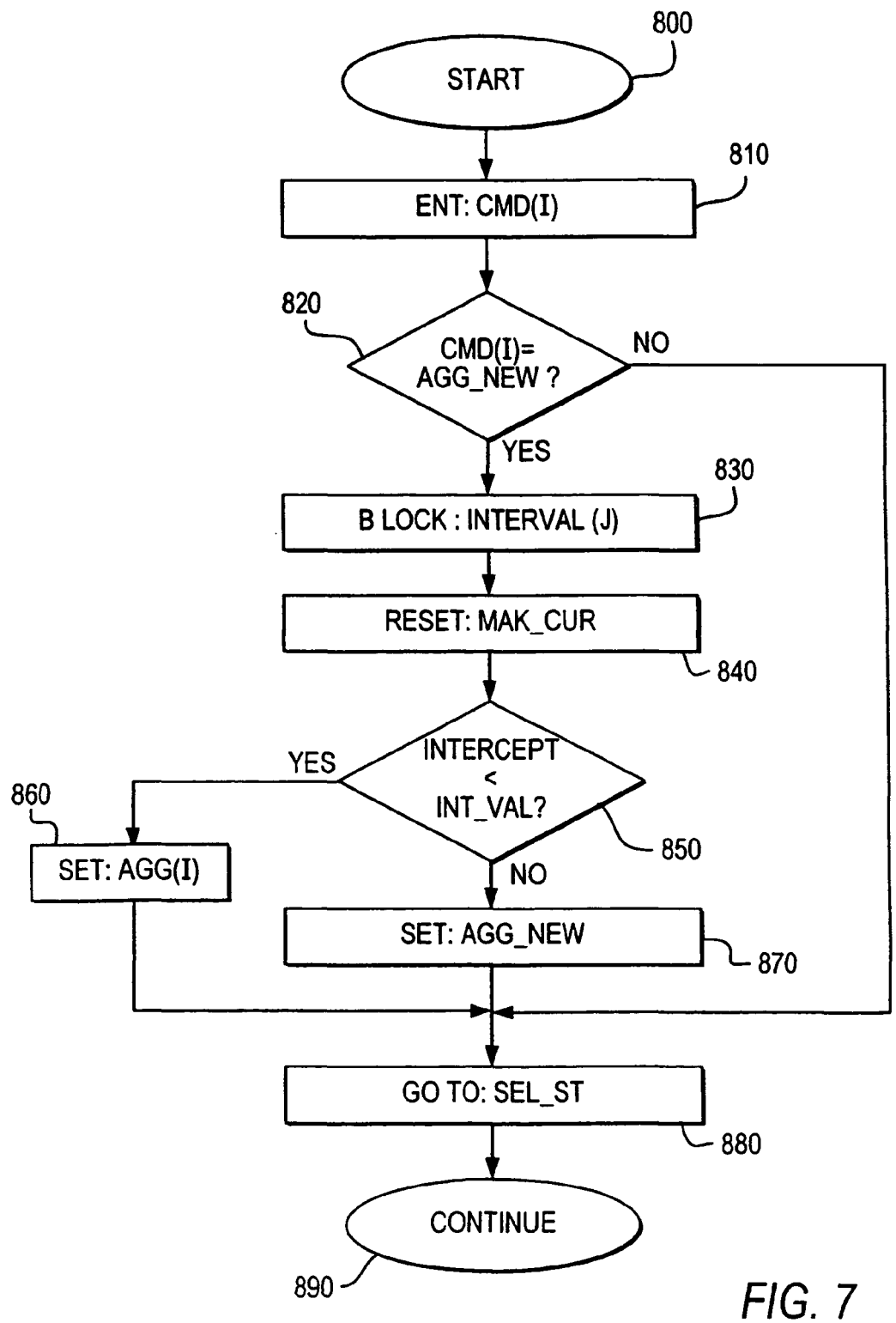
FIG. 7 is a logic diagram of a When State according to the invention.

When State processing is shown in FIG. 7 and is triggered by an entered trading command CMD(I) 810. Test 820 confirms whether the new trading command (Hit or Lift) is from a new Aggressor; if not, logic continues to 880 and then to either the Workup or Workdown State.

When the new trading command is from a new Aggressor, logic branches from test 820 to 830, where the market is blocked for a preset time interval. At 840, all current Active Side Makers are reset to zero. At test 850, the system determines whether these Makers intercept the Aggressor before the time interval expires. If yes, the intercepting maker becomes the Aggressor at 860, with full control over the succeeding trade sequence. If not, the new Aggressor is set at 870, and logic continues to the next State at 880.

Referring to QUADs 3A and 3B below, the following sequence illustrates the foregoing system logic. In QUAD 3A, the Bid-Offer State has two Participants, CUSTs 3002 and 3003 each showing bids at 10 million.

Participant CUST 3007 has just placed an uncleared Offer for 1 million. Participant CUST 3001 would like to take the new Offer by Participant CUST 3007—but cannot do so automatically. In QUAD 3B, Participant CUST 3001 attempts to take the Offer by Participant CUST 3007, forcing the system into the When State and creating an uncleared list for the Active Side (i.e., Bid). However, the prequantity of the first two bidders is reduced to zero—because the system logic prevents these bids from being enforced at the new price point (108.04+). In this example, the second interval timer provides both original Makers CUST 3002 and CUST 3003 priority over Participant CUST 3001, with CUST 3002 retaining overall priority via placement in the queue.

| QUAD 3A | | | | | |
|---|---|---|---|---|---|
| >7.625.225 | | TZ | | | |
| 108.04 | 20 | | *108.04+ | | 1 |
| CUST | BID | BOT | CUST | OFFER | SOLD |
| 3002 | 10 | 0 | 3007 | 1 | 0 |
| 3003 | 10 | 0 | | | |
| TOTAL | 20 | 0 | | 1 | 0 |

| QUAD 3B | | | | | |
|---|---|---|---|---|---|
| >7.625.225 | | TZ | | | |
| 108.04 | 20 | | 108.04+ | WTAK | 1 |
| CUST | BID | BOT | CUST | OFFER | SOLD |
| 3002 | 0 | 0 | 3007 | 1 | 0 |
| 3003 | 0 | 0 | | | |
| 3001 | 1 | 0 | | | |
| TOTAL | 1 | 0 | | 1 | 0 |

Transactions forming a Trade take place in accordance with the invention during one of two trading states, known as the Workup and Workdown States. The Workup State occurs pursuant to Hits or Lifts by an Aggressor taking the entire volume shown on the Passive Side. Once established, the Workup State gives exclusive rights to the Trade to the initial Traders—who the system recognizes as the current workers. On screen, current workers are highlighted in a defined manner known to other Participants. Current workers control the Trade and can submit additional transaction volume to their contra-traders; this is to the exclusion of outside Participants. Current workers on the Active Side of the Trade will include the Aggressor, and possibly other Traders below the Aggressor with transactions that move the Trade into the "Workup" State by filling residual volume that needs "Workdown." For the Passive Side, an Aggressor that takes the entire size limits current worker status to himself and his counterparty.

The status of current worker dissipates upon entry of "done" by a Participant or the lapse of the trading inactivity interval. Again, this interval is a preset system parameter triggered via system logic. Absent such termination, current workers can trade almost indefinitely, as long as they continue to respond to their contra-party's size offerings.

Figure 8:
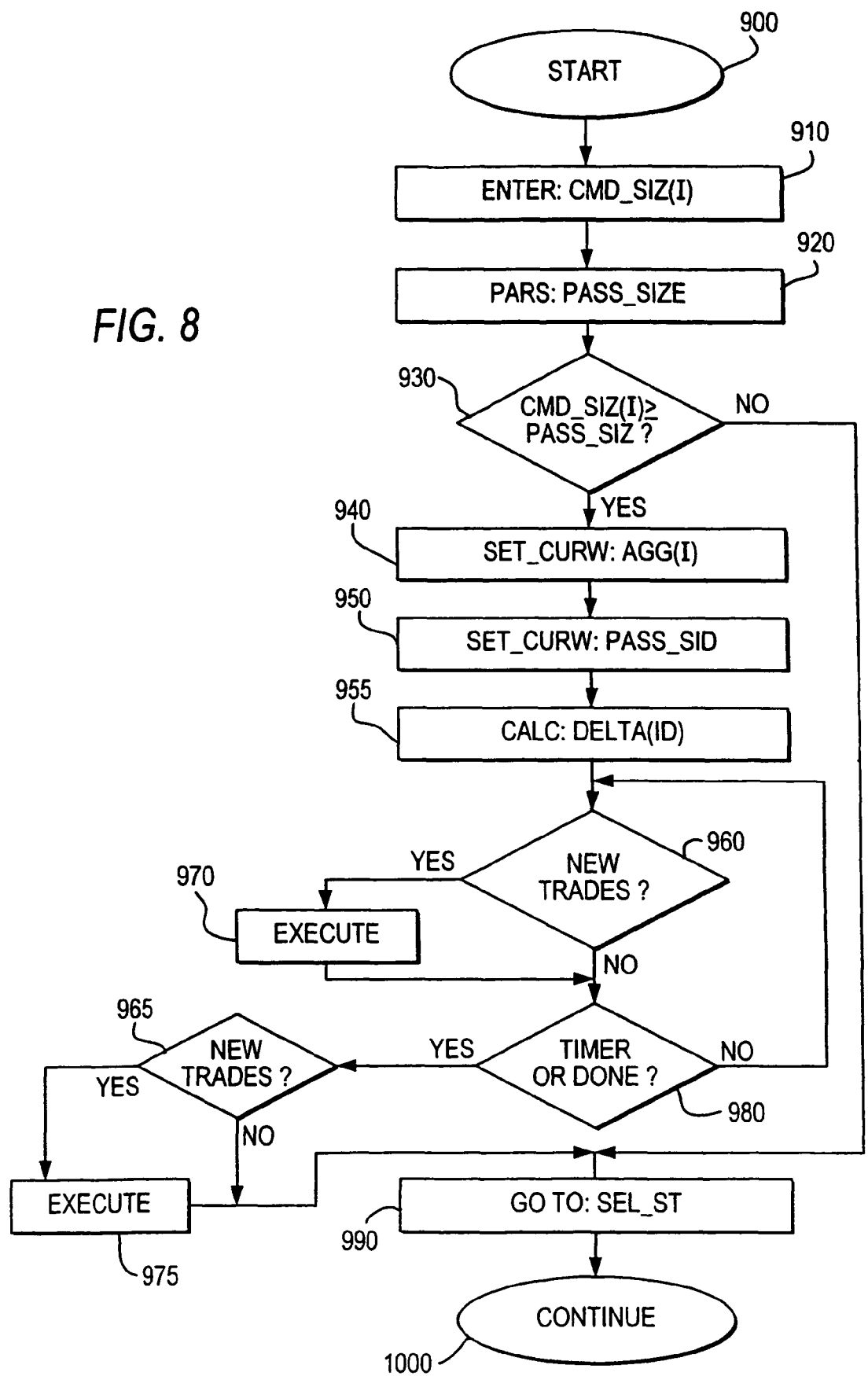
FIG. 8 is a logic diagram of a Workup State according to the invention.
Figure 9:
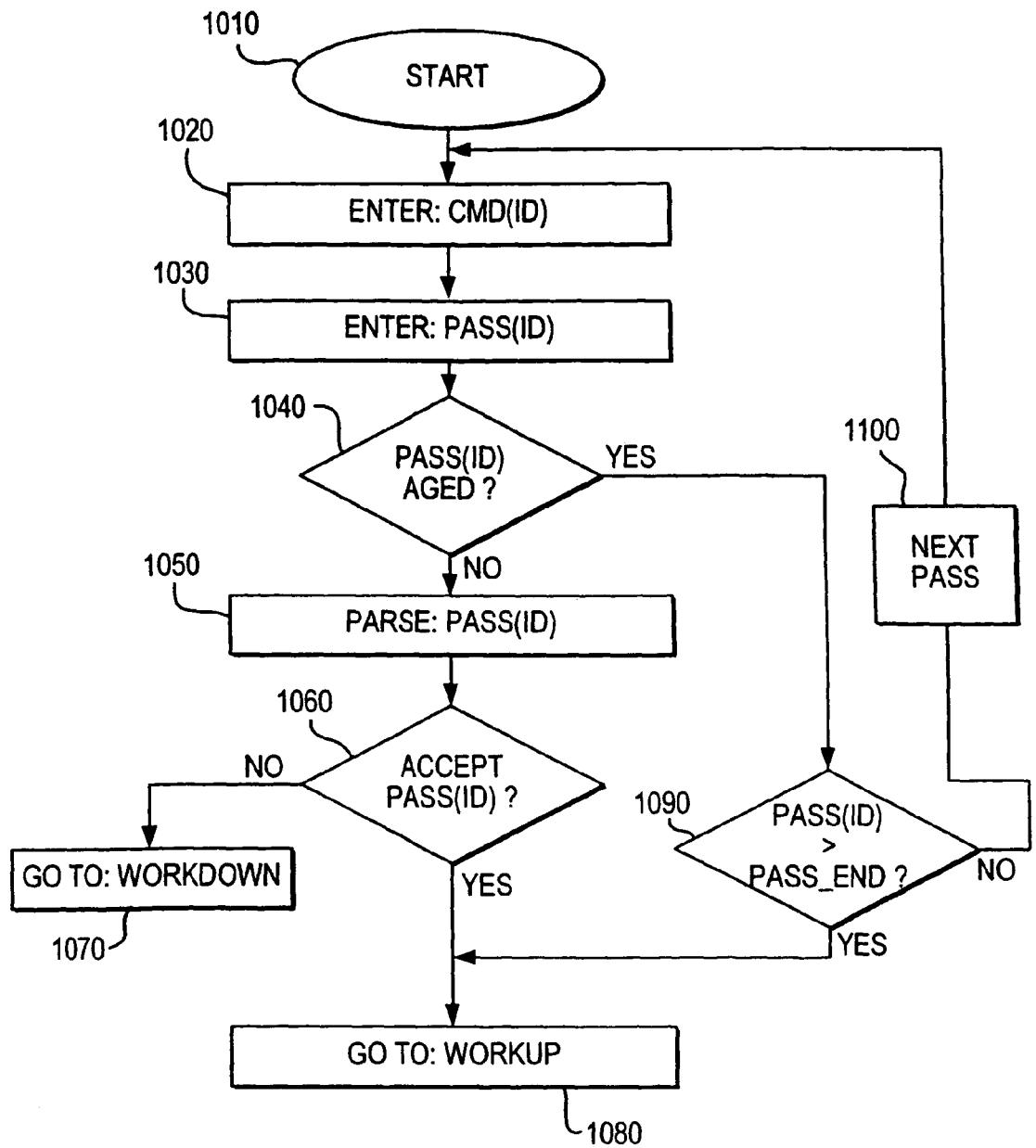
FIG. 9 is a logic diagram of a Second Look State according to the invention.

Workup State logic is shown in FIG. 8 and is tied to size and new order data. The Aggressor size is entered at 910 and the size of the Passive Side is determined at 920 prior to trade entry. At test 930, the system determines whether the Aggressor has taken the entire market offering at the time of the Trade; if not, logic continues to "select state" 990 and ultimately to the Workdown State (FIG. 9).

If the Aggressor has taken the entire market offering, test 930 passes logic to 940 and 950, where the current workers are assigned and new Trades are entered by those current workers to the exclusion of other Participants. Under these conditions, and if more than one price queue exists on the Passive Side, the system provides for Price Improvement trading. That is, the Aggressor has taken Trades at multiple price points, indicating a willingness to trade at prices worse than the best Offers/Bids. The system measures the Spread between the best and worst price shown for each contra-trader. A mathematically determined value is set at 955 bridging the two price points (e.g., the average of the two prices), with the new price difference variable, Delta (ID), set for that Trader. Given this new price point (a "Price Improvement" from both parties' viewpoint), new Trades may be entered at test 960 and executed at 970. This continues until the current workers are done or the preset interval expires as determined at test 980. The system then tests (at 965) and executes (at 975) any new transactions entered (via Hit or Take commands) by new Participants.

The above logic may be better understood with examples. A system without the Price Improvement feature is shown in QUAD 4A below, with a typical opening Bid-Offer displayed.

| QUAD 4A | | | | | |
|---|---|---|---|---|---|
| >7.625.225 | | TZ | | | |
| 108.04 | 16 | | 108.05+ | | 45 |
| CUST | BID | BOT | CUST | OFFER | SOLD |
| 3001 | 5 | 0 | 3007 | 25 | 0 |
| 3002 | 5 | 0 | 3006 | 10 | 0 |
| 3003 | 1 | 0 | 3005 | 10 | 0 |
| 3001 | 5 | 0 | | | |
| TOTAL | 16 | 0 | | 45 | 0 |

Assume that the Bid is Hit by Participant CUST 3005 selling the entire size (16 million) to the Passive Side. This results in Participant CUST 3005 (as the Aggressor) and the contra-trader (Participant CUST 3001) as the current workers. The Workup State now exists as the Aggressor has taken all of the initial size from the Passive Side. Those with priority, the Aggressor and first best bidder, are highlighted by a video attribute (shown in QUAD 4B as, for example, rectangular boxes).

| QUAD 4B | | | | | |
|---|---|---|---|---|---|
| >7.625.225 | | TZ | Refno 68119 | | |
| 108.04 | Hit | 16 | 108.05+ | | 36 |
| CUST | BUY | BOT | CUST | SELL | SOLD |
| 3001 | 0 | 10 | 3005 | 0 | 16 |
| 3002 | 0 | 5 | | | |
| 3003 | 0 | 1 | | | |
| TOTAL | 0 | 16 | | 0 | 16 |

Participant CUST 3002, wishing to continue, adds an additional 5 million size (adding to Participant CUST 3002's original 5 million), which is displayed as 5 under BUY and 5 under BOT (see QUAD 4C). A new Participant CUST 3004 now enters a sell order (Hit) for 50 million.

| QUAD 4C | | | | | |
|---|---|---|---|---|---|
| >7.625.225 | | TZ | Refno 68119 | | |
| 108.04 | Hit | 16 | 108.05+ | | 36 |
| CUST | BUY | BOT | CUST | SELL | SOLD |
| 3001 | 0 | 10 | 3005 | 0 | 16 |
| 3002 | 5 | 5 | 3004 | 50 | 0 |
| 3003 | 0 | 1 | | | |
| TOTAL | 5 | 16 | | 50 | 16 |

New Participant CUST 3004 waits until the current workers are done (via keyboard entry or timer controlled system interval). After this, the system executes for Participant CUST 3004 the sale of the additional 5 million to Participant CUST 3002, leaving 45 million remaining to be sold.

QUAD 4D shows the display after Participant CUST 3004 has traded with Participant CUST 3002. The asterisks next to the entries for CUSTs 3001 and 3005 indicate that these initial Traders are done or have timed-out. As shown in QUAD 4D, no one can control the Trade to the exclusion of others because there is no longer a current worker.

| QUAD 4D | | | | | |
|---|---|---|---|---|---|
| >7.625.225 | | TZ | Refno 68119 | | |
| 108.04 | Hit | 21 | 108.05+ | | 36 |
| CUST | BUY | BOT | CUST | SELL | SOLD |
| *3001 | 0 | 10 | *3005 | 0 | 16 |
| 3003 | 0 | 1 | 3004 | 45 | 5 |
| 3002 | 0 | 10 | | | |
| TOTAL | 0 | 21 | | 45 | 21 |

Market moves by Participants are often fast paced and can occasionally result in almost simultaneous position changes. For example, a first Participant can hit a second Participant's bid of a particular size via the "buy/sell all" key an instant after the second Participant significantly increases the bid size (e.g., from 5 to 20 million). The Aggressor has now inadvertently taken much more than planned.

System logic addresses this problem by creating a supplemental state, known as "Second Look" State. When the size of the Passive Side increases just prior to a Hit or Lift command, the system distinguishes the very recent increase in volume from earlier entries via an "age" timer (i.e., a system interval). The age timer tracks the pendency of all Bids and Offers and creates a Second Look State whenever a Hit/Lift (via a buy/sell all key) command entry occurs while a Bid/Offer is less than, for example, two seconds old.

The Second Look State, however, is limited. The Aggressor completes the transaction excluding the new "unaged" Bid/Offer. This new size is left untraded and others may add more Bids/Offers on it, the Passive Side, but these Bids/Offers stay "below the line." Even though the Aggressor did not fill the entire size displayed, the Aggressor assumes current worker status and has the right to:

1. take the new size, entering the Workup State with the contra-trader;
2. refuse the new size (via the "done" command), sending the Trade into the Workdown State; and
3. Take/Hit a "partial" amount and then lose priority, causing the system to enter the Workdown State.

Second Look State logic is shown in FIG. 9, where trading commands are entered time-stamped at 1020 and extant passive Maker entries are entered at 1030. Test 1040 determines whether the Passive Side entries, PASS(ID), are "aged" (i.e., not just recently entered). If they are aged, logic branches to test 1090 to determine whether PASS(ID) is the last entry, PASS_END. If not, a pass counter is incremented at 1100 and logic returns to sequence start 1010.

If the Passive Side entries are not aged, test 1040 shifts logic to 1050 where the new entry is parsed; the Aggressor is then given the opportunity to take the new additional size within the Trade at test 1060. The system maintains the commitment of the Aggressor to the original size of the Take or Hit. If accepted, logic branches at 1080 to the Workup State. If not accepted, logic branches at 1070 to the Workdown State.

These principles of the invention are illustrated in the following sequence of screen displays shown in QUADs 5A-C below. Participant CUSTs 3001, 3002, and 3003 show 5 million, 1 million, and 1 million, respectively, as having been bought. Just prior to the sell order by Participant CUST 3007 (via, e.g., a "HIT ALL" key), CUST 3004 enters with a 1 million size. All size transacts, except this late 1 million because it has not "aged" sufficiently as measured by the system interval timer. This amount remains untraded, and the system enters the Second Look State.

| QUAD 5A | | | | | |
|---|---|---|---|---|---|
| >7.625.225 | | TZ | Refno 68119 | | |
| 108.04 | Hit | 7 | | | |
| CUST | BUY | BOT | CUST | SELL | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| TOTAL | 1 | 7 | | 0 | 7 |

If Participant CUST 3007 decides to fill this outstanding 1 million size, the state moves out of Second Look and into the Workup State with CUST 3007 and CUST 3001 as current workers. As shown QUAD 5B, CUST 3007 has also entered a sell order for a volume of 2 million. The priority box blinks or is highlighted in some way to indicate that the Aggressor is in the Second Look State.

| QUAD 5B | | | | | |
|---|---|---|---|---|---|
| >7.625.225 108.04 | Hit | TZ | Refno 68119 8 | | 0 |
| CUST | BUY | BOT | CUST | SELL | SOLD |
| 3001 | 0 | 5 | 3007 | 2 | 8 |
| 3002 | 0 | 1 | | | |
| 3003 | 0 | 1 | | | |
| 3004 | 0 | 1 | | | |
| TOTAL | 0 | 8 | | 2 | 8 |

If, however, CUST 3007 passes, the Trade goes to the Workdown State (see QUAD 5C). New Participant CUST 3005 now enters and is positioned below the line and can only trade after CUST 3001 is done and CUST 3004 trades.

| QUAD 5C | | | | | |
|---|---|---|---|---|---|
| >7.625.225 108.04 | Hit | TZ | Refno 68119 7 | | 0 |
| CUST | BUY | BOT | CUST | SELL | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| 3005 | 1 | 0 | | | |
| TOTAL | 1 | 7 | | 0 | 7 |

Another state for trading logic is the Workdown State. It occurs when the original Aggressor takes less than all of the size showing on the Passive Side. The remaining size must be "worked down" to complete the Trade. This rewards those Participants that show Bids/Offers (i.e., their intent to buy/sell), thus providing liquidity to the market. If the original Aggressor returns for the remaining size from the Passive Side, the Workup State is initiated. Another Trader from the Active Side may work down the remaining Passive Side quantity, putting the Trade in the Workup State—with this new Trader as the current worker—which includes obtaining Exclusive Time if all the remaining size from the original Bid-Offer State is taken.

Figure 10:
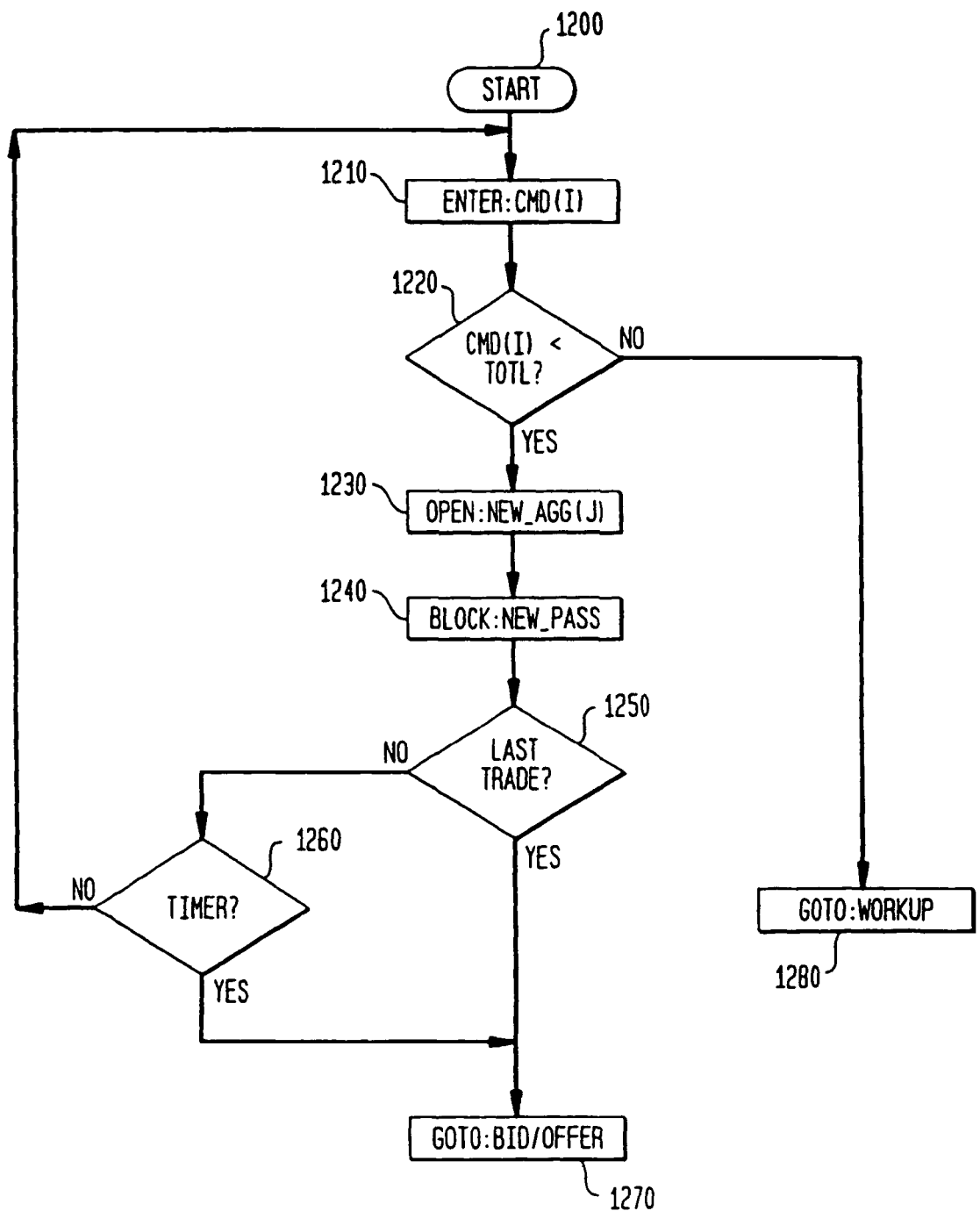
FIG. 10 is a logic diagram of a Workdown State according to the invention.

The Workdown State allows new Aggressors to complete the remaining unhit Bids on the Passive Side. Workdown State logic is shown in FIG. 10. Trading command CMD(I) is entered at 1210. At test 1220, the system checks whether the Trade is for less than the total Passive Side, TOTL. If not, logic branches at 1280 to the Workup State.

If the Trade is for less than the total Passive Side, test 1220 passes logic to 1230 where the system opens trading to new Aggressors in order to complete the pending Passive Side volume. However, no new Passive Side entries are entitled to Exclusive Time and are thus blocked at 1240 for the trade duration. Test 1250 determines whether the last Trade occurred and test 1260 determines whether the timer has lapsed. If either has occurred, Workdown is terminated and the process returns at 1270 to the Bid-Offer State.

Importantly, new Traders presenting on the Passive Side wait until all of the remaining original size is worked down—and their positions are held below the line. This is shown in QUADS 6A-6C.

| QUAD 6A | | | | | |
|---|---|---|---|---|---|
| >7.625.225 108.04 | | TZ 15 | *108.04+ | | 25 |
| CUST | BID | BOT | CUST | OFFER | SOLD |
| 3001 | 5 | 0 | 3007 | 25 | 0 |
| 3002 | 10 | 0 | | | |
| TOTAL | 15 | 0 | | 25 | 0 |

QUAD 6A shows the Bid-Offer State with Participant CUST 3001 showing a bid of 5 million and Participant CUST 3002 showing a bid of 10 million. As the Aggressor, CUST 3001 Takes an Offer from CUST 3007, but for only 5 million of CUST 3007's showing of 25 million, leaving 20 million on the Passive Side (see QUAD 6B).

| QUAD 6B | | | | | |
|---|---|---|---|---|---|
| >7.625.225 108.04 | | 11 | TZ Refno 68118 108.04+ | TAK | |
| CUST | BUY | BOT | CUST | SELL | SOLD |
| *3001 | 0 | 5 | 3007 | 20 | 5 |
| TOTAL | 0 | 5 | | 20 | 5 |

At this point, if Participant CUST 3006 enters a 10 million Offer, CUST 3006 waits until the original Passive Side clears; CUST 3006 is thus kept below the line as the remaining size is worked down (see QUAD 6C).

| QUAD 6C | | | | | |
|---|---|---|---|---|---|
| >7.625.225 108.04 | | 11 | TZ Refno 68118 108.04+ | TAK | 5 |
| CUST | BUY | BOT | CUST | SELL | SOLD |
| *3001 | 0 | 5 | 3007 | 20 | 5 |
| | | | 3006 | 10 | 0 |
| TOTAL | 0 | 5 | | 30 | 5 |

A Trade is cleared by either a system controlled timer or directly by a Participant when that price point attracts no further buyers or sellers. The clearing function resurrects a new Bid-Offer State, retaining original Makers from the Active Side (unless superceded) and the remaining untraded size from the Passive Side.

As discussed above, the system can provide enhanced performance allowing Price Improvement processing. Price Improvement provides a modified interactive Bid-Offer State and transforms the auction process into a multiple price auction process, where buy or sell orders are executed at one or more prices.

For Price Improvement, the Bid-Offer State reveals Participants willing to trade at prices above or below the current best market prices, particularly at sizes that may be significantly larger than the current sizes shown to the marketplace at the best Bid-Offer. All rules of the Bid-Offer State apply to each individual price stack or tier under Price Improvement. Priority is retained only in the top tier and by the best price, first bidder/offeror.

If an Aggressor acts on only one level, then the Workup or Workdown State (as previously described) is initiated and limited to that queue's price level. Even in this single level environment, a Trade may be "price improved" by system logic. This can occur, for example, if an Aggressor enters the Workup State. Price Improvement will be triggered by a passive Trader entering a better priced buy/sell. If the initial "best" passive Trader matches this new better price, the Trade will be consummated, but at a price determined by the system that is between the new better price and the original trade price, thus improving the price for both sides of this Trade. This is an example of Price Improvement initiated by the Passive Side via When State processing. The same system determined price would occur if the initial best passive Trader declined to match the new better price, turning the Trade over to the new Passive Side Trader.

This demonstrates that by becoming an Aggressor in a Price Improvement Trade, the Aggressor creates the possibility that a buy or sell order may be executed at a better price than is revealed by the current state of Bids and Offers displayed on the system. By doing so, the Aggressor initiates a modified Workup State (discussed below with respect to FIG. 8).

QUAD 7A shows three levels of Bids and Offers. The number of levels shown is a system parameter and is typically tied to the number of price increments on the Bid and Offer sides, that is, a cardinal arrangement (e.g., 1132 increments). An alternative tier arrangement includes an ordinal arrangement (e.g., "top five tiers"). In this example, all Participants are shown four bids totaling 67 million (CUSTs 2001 and 2002 showing a total of 2, CUST 2005 showing 20, and CUST 2012 showing 45). These bids range from 100.01 down to 100.00. QUAD 7A also shows five offers totaling 85 million (CUSTs 2007 and 2006 showing a total of 15, CUST 2008 showing 10, and CUSTs 2007 and 2011 showing a total of 60), ranging from 100.02 up to 100.03+. This contrasts with a single queue Bid-Offer State where only two Bids totaling 2 million at 100.01 and two Offers totaling 15 million at 100.02 would be shown.

An alternative arrangement (not shown) may not disclose all prices and sizes to all Participants. In this case, system logic controls the secondary tiers and buy and sell allocations.

tions, the Aggressor gains first priority for potential price improvement during execution of the volume associated with the price surplus. Priority rankings provide the opportunity for purchases and sales at better prices than the best market of 100.01 and 100.02 by allowing the Buyers or Sellers' Surplus created upon the initiation of a Price Improvement Trade to be allocated among the Participants (i.e., allow the system to set a price-improvement price).

The Aggressor who initiates the Price Improvement Trade is granted protection by allowing contra-traders to buy or sell more at the higher or lower prices shown. This is accomplished by system logic that measures the surplus and allocates any available surplus among the Trader and contra-traders. By allowing one or both sides of the Trade to execute Trades at better prices than their respective revealed intentions, aggressive and/or passive Traders benefit. The system benefits the market by creating greater liquidity, improving revealed intentions of bidders and offerors, increasing depth of markets, allowing multiple price Trades, and forming the foundation for alternative commission fees.

Once trading commences, state sequencing follows the logic of a single price Trade. For example, in the Price Improvement Bid-Offer State shown in QUAD 7A, a new seller becomes the Aggressor with a command to sell 90 million down to 99.31 (i.e., 99+$^{31}/_{32}$nds). In order to improve the seller's ability to sell at the "best price" available, the first best bidder whose priority is ranked on a price and time basis (or by a metric comprised therefrom or including size as well) is given the opportunity to buy additional volumes at an improved price after the 67 million has been Hit (i.e., 2 million sold at 100.01, 20 million sold at 100.00+, and 45 million sold at 100.00). By offering to sell a total of 90 million down to 99.31, the seller sells the first 67 million and has "intent" to sell 23 million more. The first best bidder can now execute more at an improved price. The level of improvement is allocated between the bid price of 100.01 (i.e., 100+$^{1}/_{32}$nd) and the 99.31 reservation price. Thus, if buyer CUST 2001 trades the remaining 23 million with the 99.31 seller, then a Price Improvement Trade of 23 Hit at 100.00 is consummated. Here, buyer CUST 2001 maintains priority by com-

| | QUAD 7A | | | | | | |
|---|---|---|---|---|---|---|---|
| 100.01 | | | 2 | 100.02 | | 15 | |
| | CUST | BID | BOT | CUST | | OFFER | SOLD |
| | 2001 | 1 | 0 | 2007 | | 5 | 0 |
| | 2002 | 1 | 0 | 2006 | | 10 | 0 |
| | TOTAL | 2 | 0 | | | 15 | 0 |
| 100.00+ | | | 20 | 100.03 | | | |
| | 2005 | 20 | | 2008 | 10 | 10 | 0 |
| | TOTAL | 20 | | | | 10 | 0 |
| 100.00 | | | 45 | 100.03+ | | 60 | |
| | 2012 | 45 | | 2007 | | 20 | |
| | | | | 2011 | | 40 | |
| | TOTAL | 45 | | | | 60 | 0 |
| 100.45x.00 | 20 x .00+ 2x | 2x | | .01 X 15x | .02 10x .03 60x | .03+ | |

The logic of the Workup State with Price Improvement encourages Participants to reveal their trading intentions even away from the best price shown by allowing them to participate in a Price Improvement Trade if one is initiated. For example, Price Improvement will attach to a Participant who becomes an Aggressor away from the best market prices of 100.01 and 100.02 (of QUAD 7A). By revealing such intenmitting to buy 23 million more at the bid level of 100.01. However, the actual trade price is, for example, 100.00, providing the buyer with 0.01 ($^{1}/_{32}$) price improvement and the seller with a like 0.01 price improvement over the reservation sale price of 99.31.

System logic has apportioned the Trader Surplus between the aggressive and passive sides of the Trade, benefitting both parties. System logic could also allocate the surplus alternatively (e.g., providing the Aggressor with ⅔, all, or none of the surplus). The allocation mechanism could also dynamically change depending on the size of the Trade or other customer or trade characteristics. The system flashes the sequence of three Trades, 2 @ 100.01, 20 @ 100.00+, 68 (45+23) @ 100.00, preferably with highlighting to indicate that the sequence is a set of Price Improvement Trades. Alternatively, the total Trade at the average price could be displayed. At the end of the Trade, system logic returns to the Bid-Offer State.

Under Price Improvement processing, separate mechanisms present and display multiple Bid-Offers at different price levels. A first option is to remove all out of market Bid-Offers (i.e., all inferior offerings are not displayed). A second option provides the bidder with a choice as to whether the bidder's inferior bid is left on the display or removed when topped with a better price. A third option is to display all bids on screen even when topped. This forms a "good till cancel" offering. Another option allows Participants to customize their Bids and Offers under system controlled parameters.

Price Improvement processing also permits priority preserved trading, which occurs in a When State. The When State occurs when a non-priority Participant initiates or responds to a trading command. System logic triggers the When State allowing the priority bidder (e.g., the one with the first best price on the passive market side) to intercede and assume control of the Trade. During the When State, a timer controls a period of time during which the priority bidder can decide whether to intercede. The original buyer (whose trading command initiated the When State) is placed right behind the priority bidder, and other non-priority buyers are placed in sequence behind the first Aggressor. If the priority bidder does not intercede, logic turns the Trade over to the ranked list of buyers and the Trade moves to the Workup or Workdown State for completion. By interceding, the first best bidder maintains priority by matching the best price among the When Take Trades.

By initiating a Price Improvement here, the Hit, highlighted by video attribute, is for more size than is shown on the number of tiers of Bids or Offers available for Price Improvement.

In order to provide a greater and more diverse opportunity for Price Improvement and to protect the Price Improvement Aggressor, all buy and sell orders received during Exclusive Time are ranked and matched to provide the greatest amount of price protection to the Price Improvement Aggressor. Because of multi-levels of Bids and Offers, the first best bidder/offeror maintains priority only if that bidder/offeror responds at the Aggressor's price, or, if necessary, matches the best When Take/Hit price.

Referring to QUAD 7B, Participant CUST 2008 becomes the Aggressor by initiating a Price Improvement Trade by committing to sell 90 million down to a price of, for example, 99.31. During Exclusive Time, Participant CUST 2001 commits to buy 5 million more at 100.01, Participant CUST 2009 commits to buying 20 million at 100.01+, and Participant CUST 2002 commits to buying 5 million more at 100.01. Customer 2001 does not then match the buy price of 100.01+.

| QUAD 7B | | | | | | |
|---|---|---|---|---|---|---|
| 100.01 to .00 | | | HIT 67 | | | |
| | CUST | BUY | BOT | CUST | SELL | SOLD |
| 100.01+ | 2009 | 20 | | | | |
| 100.01 | 2001 | 5 | 1 | 2008 | 23 | 67 |
| | 2002 | 5 | 1 | | | |
| TOTAL 100.00+ | 2005 | 0 | 2 20 | | | |
| TOTAL 100.00 | 2012 | 0 | 20 45 | | | |
| TOTAL | | | 67 | | | |

CUST 2001 has a priority over CUSTs 2002 and 2009 by having been the original best bidder and commits to buying more at CUST 2001's original price. At the end of Exclusive Time, 20 of the 23 million to be sold are matched with the best buys shown, thus 20 million are sold to 2009. The remaining 3 million are sold to CUST 2001. By not matching the 100.01+price, CUST 2001 only obtains the 3 million. By maintaining price and time priority, price improvement is obtained and the Aggressor is protected. The Trades are shown in QUAD 7C.

| QUAD 7C | | | | | | |
|---|---|---|---|---|---|---|
| 100.00 × 45 .00 + X23 | | | | .01X22HIT | | |
| | CUST | BUY | BOT | CUST | SELL | SOLD |
| 100.01 | 2001 | | 1 | 2008 | | 22 |
| | 2002 | | 1 | | | |
| | 2009 | | 20 | | | |
| TOTAL 100.00+ | 2005 | | 22 20 | 2008 | | 22 23 |
| | 2001 | | 3 | | | |
| TOTAL 100.00 | 2012 | | 23 45 | 2008 | | 45 |
| TOTAL | | | 45 | | | 45 |
| TOTAL | | | 90 | | | 90 |

Participants interact with system logic during Price Improvement trading via an input device. Various input devices can be used as exemplified by the specialized keyboard shown in FIG. 12. The keyboard includes special LCD keys, whose function and display is directly tied to the state of the trading processor. The keyboard has two vertical rows of 5 LCD keys each and a horizontal row of 7 LCD keys. The horizontal row of LCD keys dynamically displays the three different price levels available on both the Bid and Offer sides. This row is called the "Price Row." This display updates in real time as prices change in the trading processor. The center key in this row shows a price incrementor value. The most appropriate incrementor value is determined by the trading processor based on the range of the Spread between the best and worst markets. This incrementor value is also updated in real time as prices change. The bid prices travel to the left of the keyboard from the center key in order of best to worst. Similarly, the Offer prices travel to the right. As different price levels appear in the Price Improvement Bid-Offer State, they are displayed in the Price Row. To facilitate data entry and quick reaction to the market, a Participant simply presses one of the LCD keys to chose which price level at which to trade. After selecting the price, the Participant chooses one of the action keys represented by the vertical row of the LCD keys. If the Participant wants to trade below or above the current shown prices in the market, the Participant can use the incrementor key to indicate how far above or below the prices to go.

The capabilities of the foregoing keyboard arrangement can be realized in several alternative embodiments. For example, the input commands can be arranged on a touch screen or touch pad transducer (e.g., a "mouse"). Other vehicles for inputting commands include voice command, voice activated navigation, and other "location" devices known in the art. The use of the term "key" is meant to include a command or data entry trigger (i.e., a device or switch) that when activated accomplishes a particular task.

Figure 11:
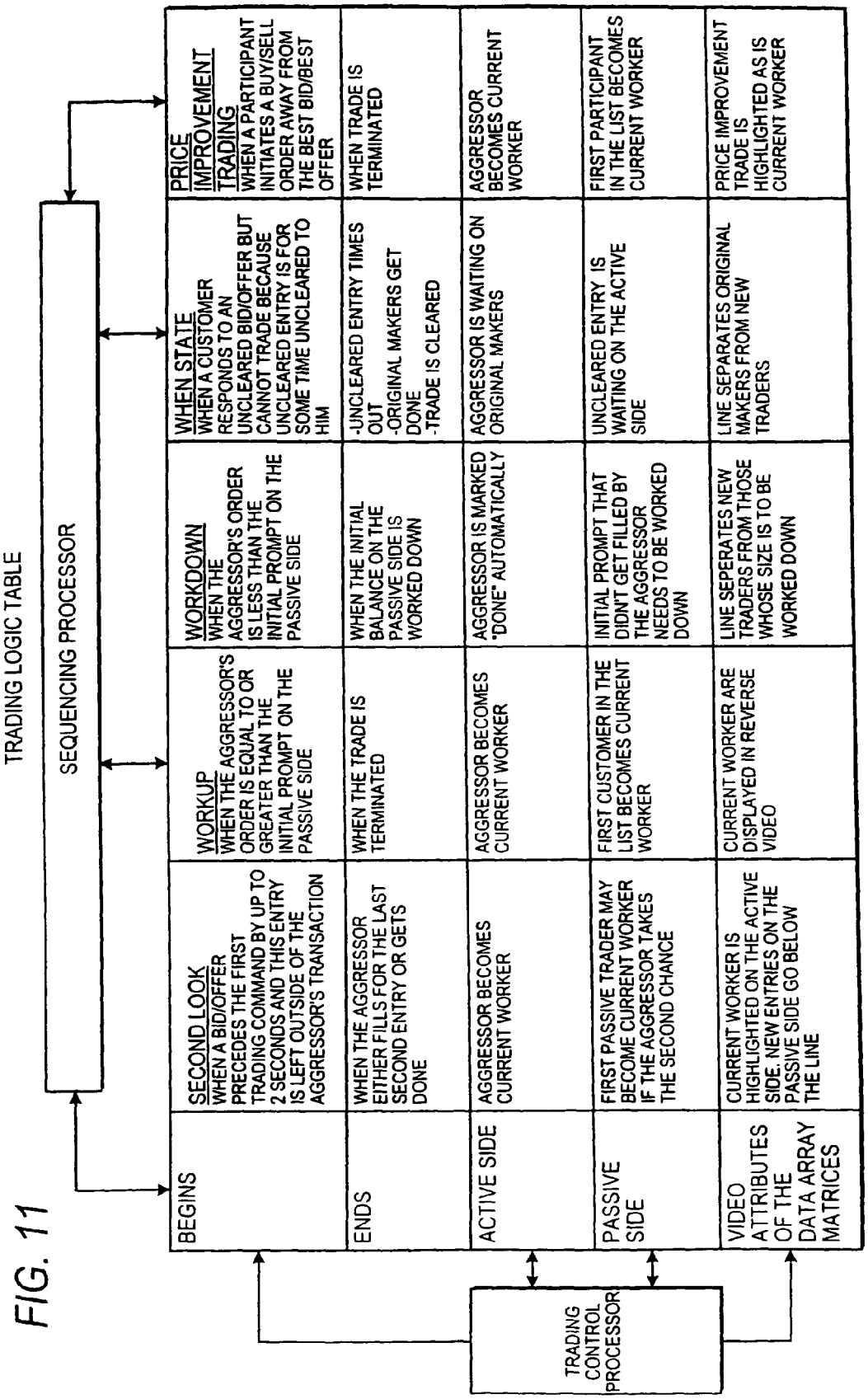
FIG. 11 is a trading logic summary table according to the invention.

The logic associated with the five states discussed herein is summarized in tabular form in FIG. 11. Features of the foregoing system have resulted in a dramatic increase in efficiency and in a reduction of trading order errors.

Figure 3A:
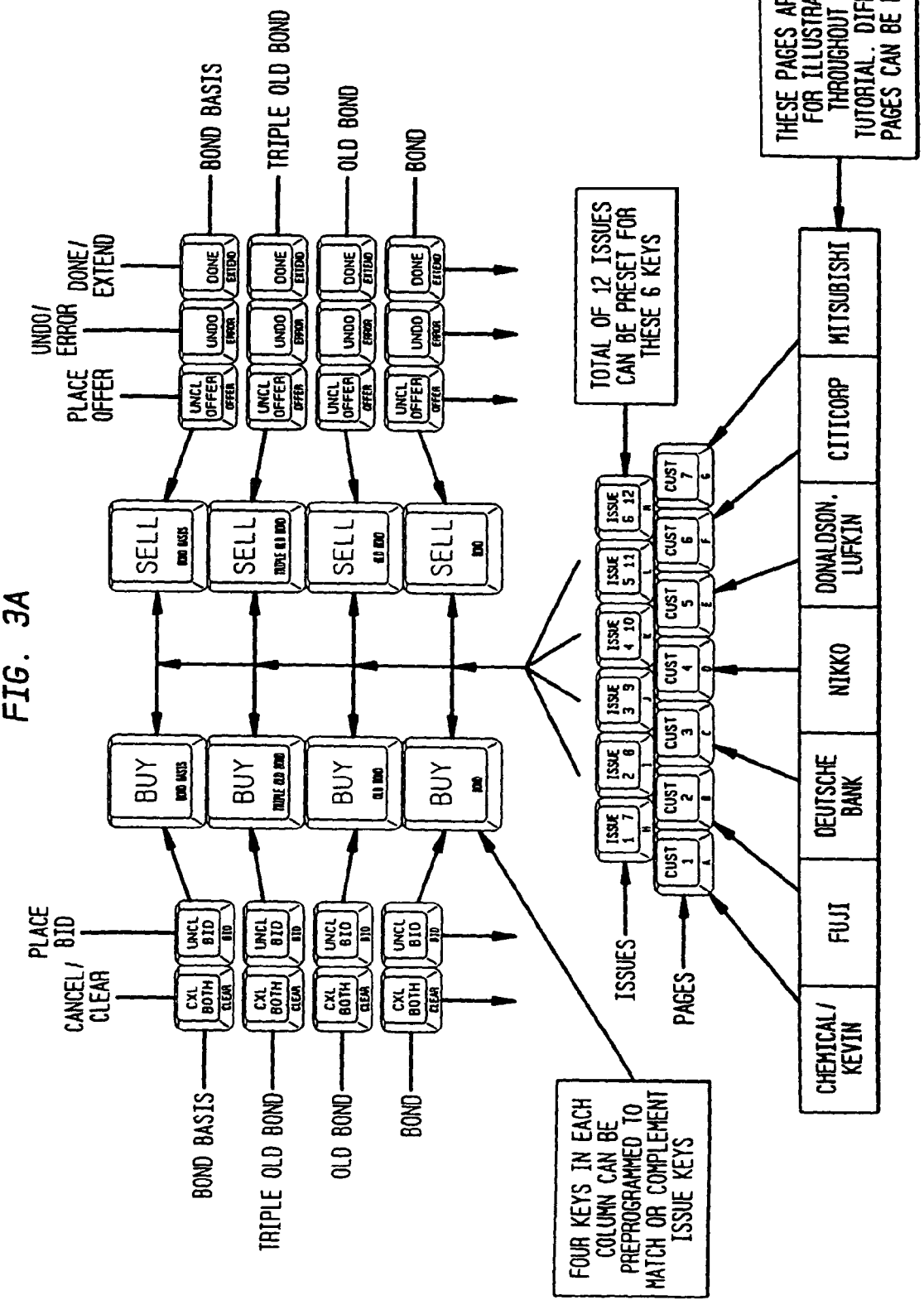
FIGS. 3A-B are drawings of dedicated keypads according to the invention.
Figure 3B:
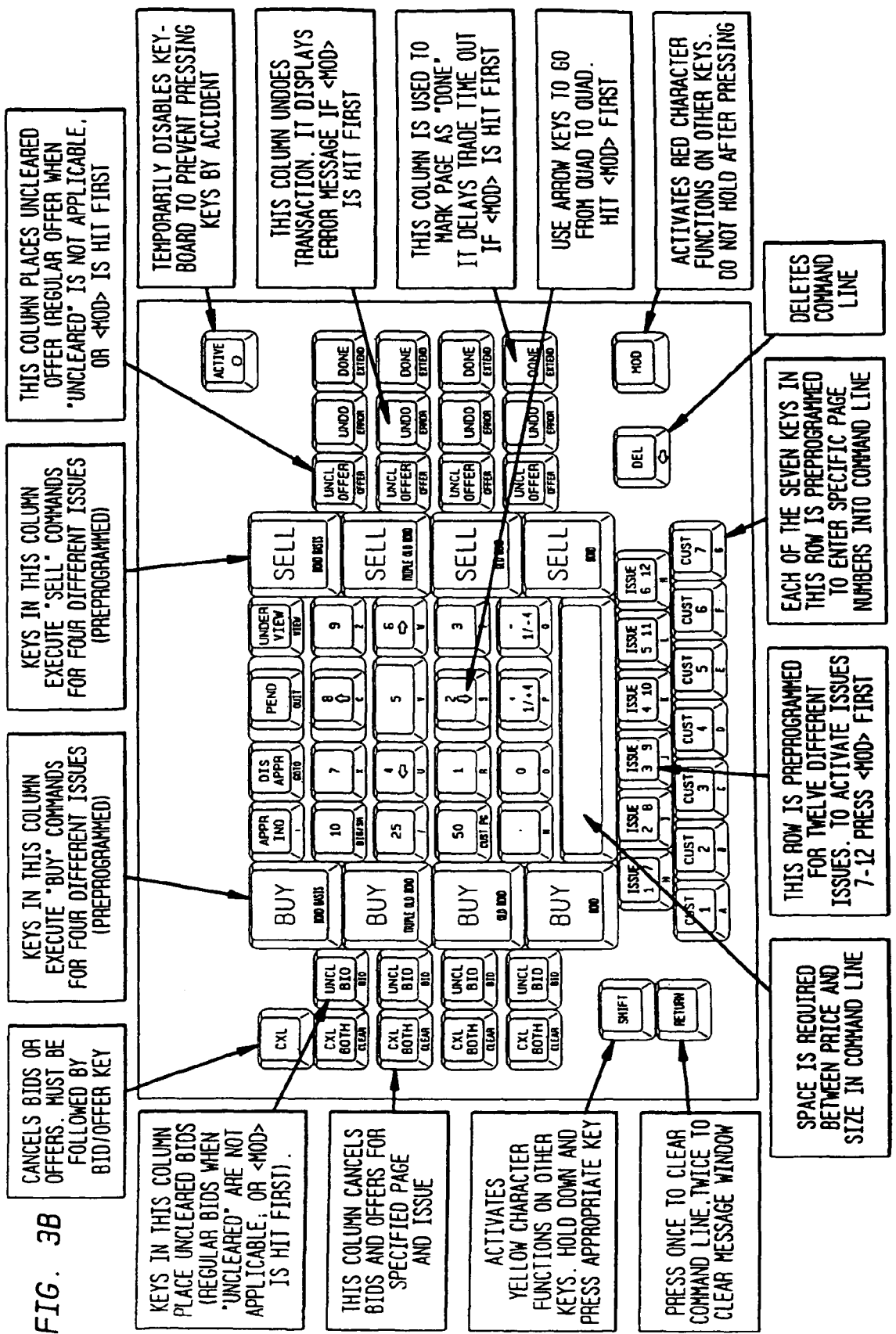
Figure 12:
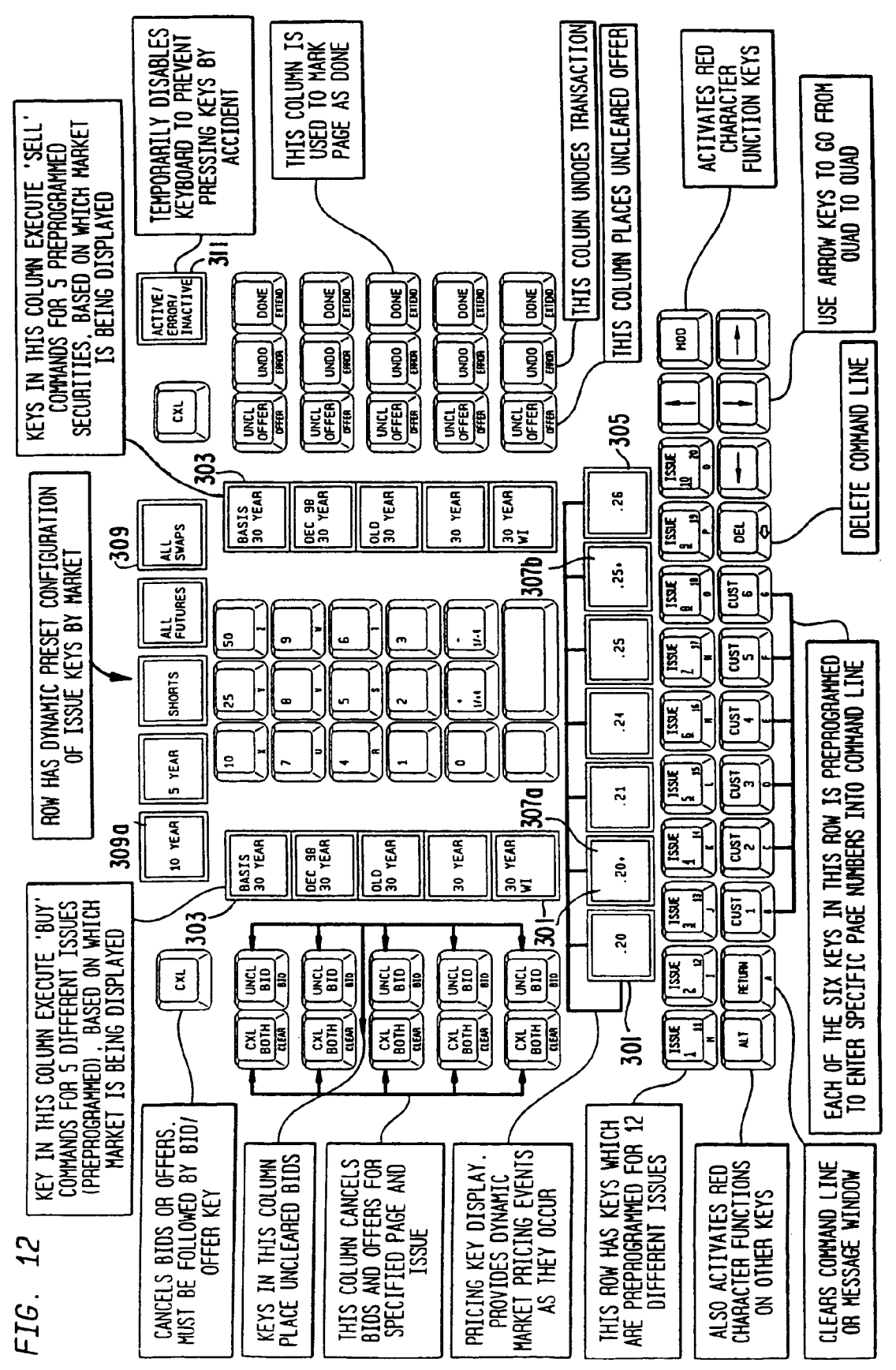

The often frenetic environment of bidding, offering, and trading, and the entry of commands on the preferred dedicated keypads shown in FIGS. 3A-B and 12, and the likelihood of Participants changing their minds, all contribute to the possibility that an erroneous Trade may be made. More particularly, errors can arise because of an incorrect entry in the system, a miscommunication, and the like. These errors can often force a "principal" Participant into an unintended position during a Trade.

The invention preferably provides ways for a Participant to effectively "undo" a Trade, either by canceling a pending order, or rolling back executions during a trade State. As shown in FIGS. 3A-B and 12, keypads preferably provide cancel (CXL), DONE, and UNDO keys to facilitate this process. The function of these keys while the system is in a particular state is described below. Note that the names of these keys are arbitrary and any input means can be used to effect the desired actions.

In the Bid-Offer State, the CXL command removes a Maker's existing markets from one or more instruments.

In the When State, CXL removes a Maker's markets only if there are no pending active BUY or SELL orders against it. Also, DONE removes from trading lists a potential Aggressor, as well as trade Participants, before orders are matched.

During the Workdown State, CXL removes any remaining passive Maker's markets. DONE performs the same function as CXL and also allows the Passive trading Participants in the Workdown State to remove themselves from trading lists, thus effectively removing their committed sizes before the system has had a chance to execute them. The UNDO function "unrolls" the Trade and reduces the size shown to Participants when executed during a predefined time period after the initial Trade. Additionally, the UNDO function proportionately reduces the amount traded by all passive Makers. The restriction of a predefined time period discourages a Trader from taking unfair advantage of this correction facility. Analogously, if no more than one Trader participated in the Trade, the UNDO function causes the Trader to join the contra-side for the size desired to be undone. The UNDO function can be invoked at any time by any Participant on the Active Side or the Passive Side; system logic preferably maintains the fairness of this trading protocol.

During the Workup State, the DONE function can remove a Participant from the Active Side, Passive Side, or both simultaneously, regardless of the size traded or solicited. In sum, the DONE function removes the Participant from the Trade. The UNDO function can also roll back the Trade provided that the first active Trader has executed this function within a predefined time period following the Trade. If the UNDO function is not invoked during this predefined period, or the Trader is not the first active Trader, then the Trader is entered immediately in the queue to buy or sell on the contra-side. Preferably, the Trader is placed at the top of the list such that the UNDO function can be effectively invoked immediately, provided there is a contra-trader. Most preferably, the rights of the first Active and Passive Traders are maintained to assure fairness.

Thus it is seen that automated price improvement protocol systems and methods are presented. One skilled in the art will appreciate that the invention can be practiced by other than the described embodiments, which are presented for purposes of illustration and not of limitation, and the invention is limited only by the claims which follow.

We claim:

1. An apparatus comprising:
   a memory having logic stored thereon; and
   a keyboard comprising:
      a first key comprising a respective Liquid Crystal Display ("LCD") configured to display to a user of the keyboard a respective price, wherein the first key is selectable by the user for submitting the price displayed by the first key;
      a second key comprising a respective LCD configured to display to the user of the keyboard a respective price, wherein the second key is selectable by the user for submitting the price displayed by the second key;
      a buy key selectable by the user of the keyboard for submitting a buy command; and
      a sell key selectable by the user of the keyboard for submitting a sell command; and
   wherein the logic, when executed by at least one processor, directs the at least one processor to:
      receive from a server a bid price available in a market for a financial instrument;
      cause the first key to display to the user of the keyboard the bid price;
      receive from the server an offer price available in the market for the financial instrument;
      cause the second key to display to the user of the keyboard the offer price;
      in response to a change in bid prices available in the market for the financial instrument, cause the price displayed by the first key to change to one of the available bid prices;
      in response to a change in offer prices available in the market for the financial instrument, cause the price displayed by the second key to change to one of the available offer prices;
      determine that the user of the keyboard has:
         i) selected the first key, and
         ii) selected the sell key;
      in response to determining that the user of the keyboard has selected the sell key, communicate a sell command for the financial instrument to the server, wherein the sell command comprises a price that is based at least in part on a bid price displayed by the first key when selected by the user;
      determine that the user of the keyboard has:
         i) selected the second key, and
         ii) selected the buy key; and
      in response to determining that the user of the keyboard has selected the buy key, communicate a buy command for the financial instrument to the server, wherein the buy command comprises a price that is based at least in part on an offer price displayed by the second key when selected by the user.

2. The apparatus of claim 1,
wherein the received bid price and the received offer price each defines, in part, a respective increment value;
wherein to cause the first key to display the bid price comprises to cause the first key to display the increment value defined by the bid price;
wherein to cause the second key to display the offer price comprises to cause the second key to display the increment value defined by the offer price;
wherein the bid prices and the offer prices available in the market for the financial instrument each defines, in part, a respective increment value;
wherein to cause the price displayed by the first key to change to one of the available bid prices comprises to cause the price displayed by the first key to change to the increment value defined by one of the available bid prices; and
wherein to cause the price displayed by the second key to change to one of the available offer prices comprises to cause the price displayed by the second key to change to the increment value defined by one of the available offer prices.

3. The apparatus of claim 1,
wherein the keyboard further comprises:
  a third key comprising a respective LCD configured to display to the user of the keyboard a respective price, wherein the third key is selectable by the user for submitting the price displayed by the third key; and
  a fourth key comprising a respective LCD configured to display to the user of the keyboard a respective price, wherein the fourth key is selectable by the user for submitting the price displayed by the fourth key; and
wherein the logic, when executed by the at least one processor, further directs the at least one processor to:
  receive from the server another bid price available in the market for the financial instrument;
  cause the third key to display to the user of the keyboard the another bid price;
  receive from the server another offer price available in the market for the financial instrument; and
  cause the fourth key to display to the user of the keyboard the another offer price.

4. The apparatus of claim 3,
wherein the received bid price and the received offer price each defines, in part, a respective increment value;
wherein to cause the first key to display the bid price comprises to cause the first key to display the increment value defined by the bid price;
wherein to cause the second key to display the offer price comprises to cause the second key to display the increment value defined by the offer price;
wherein the bid prices and the offer prices available in the market for the financial instrument each defines, in part, a respective increment value;
wherein to cause the price displayed by the first key to change to one of the available bid prices comprises to cause the price displayed by the first key to change to the increment value defined by one of the available bid prices; and
wherein to cause the price displayed by the second key to change to one of the available offer prices comprises to cause the price displayed by the second key to change to the increment value defined by one of the available offer prices.

5. The apparatus of claim 4,
wherein the received another bid price and the received another offer price each defines, in part, a respective increment value;
wherein to cause the third key to display the another bid price comprises to cause the third key to display the increment value defined by the another bid price;
wherein to cause the fourth key to display the another offer price comprises to cause the fourth key to display the increment value defined by the another offer price.

6. The apparatus of claim 3,
wherein as both the first key and the third key display prices, the price displayed by the first key is different from the price displayed by the third key; and
wherein as both the second key and the fourth key display prices, the price displayed by the second key is different from the price displayed by the fourth key.

7. The apparatus of claim 3,
wherein as both the first key and the third key display prices, the price displayed by the first key is higher than the price displayed by the third key; and
wherein as both the second key and the fourth key display prices, the price displayed by the second key is lower than the price displayed by the fourth key.

8. The apparatus of claim 3,
wherein as both the first key and the third key display prices, the price displayed by the first key is lower than the price displayed by the third key; and
wherein as both the second key and the fourth key display prices, the price displayed by the second key is higher than the price displayed by the fourth key.

9. The apparatus of claim 3, wherein the first key, the second key, the third key, and the fourth key are positioned on the keyboard in a row.

10. The apparatus of claim 9, wherein the row comprises a horizontal row when the keyboard is in use by the user.

11. The apparatus of claim 10,
wherein the third key is positioned adjacent to, and to the left of, the first key;
wherein the fourth key is positioned adjacent to, and to the right of, the second key;
wherein as both the first key and the third key display prices, the price displayed by the first key is higher than the price displayed by the third key; and
wherein as both the second key and the fourth key display prices, the price displayed by the second key is lower than the price displayed by the fourth key.

12. The apparatus of claim 10,
wherein the first key is positioned adjacent to, and to the left of, the third key;
wherein the second key is positioned adjacent to, and to the right of, the fourth key;
wherein as both the first key and the third key display prices, the price displayed by the first key is lower than the price displayed by the third key; and
wherein as both the second key and the fourth key display prices, the price displayed by the second key is higher than the price displayed by the fourth key.

13. The apparatus of claim 3, wherein the logic, when executed by the at least one processor, further directs the at least one processor to:
  in response to the change in bid prices available in the market for the financial instrument, cause the price displayed by the first key to change to one of the available bid prices, and cause the price displayed by the third key to change to one of the available bid prices; and
  in response to the change in offer prices available in the market for the financial instrument, cause the price displayed by the second key to change to one of the available offer prices, and cause the price displayed by the fourth key to change to one of the available offer prices.

14. The apparatus of claim 13,
wherein as both the first key and the third key display prices, the price displayed by the first key is different from the price displayed by the third key; and
wherein as both the second key and the fourth key display prices, the price displayed by the second key is different from the price displayed by the fourth key.

15. The apparatus of claim 13,
wherein as both the first key and the third key display prices, the price displayed by the first key is higher than the price displayed by the third key; and
wherein as both the second key and the fourth key display prices, the price displayed by the second key is lower than the price displayed by the fourth key.

16. The apparatus of claim 13,
wherein as both the first key and the third key display prices, the price displayed by the first key is lower than the price displayed by the third key; and
wherein as both the second key and the fourth key display prices, the price displayed by the second key is higher than the price displayed by the fourth key.

17. The apparatus of claim 13, wherein the first key, the second key, the third key, and the fourth key are positioned on the keyboard in a row.

18. The apparatus of claim 17, wherein the row comprises a horizontal row when the keyboard is in use by the user.

19. The apparatus of claim 18,
wherein the third key is positioned adjacent to, and to the left of, the first key;
wherein the fourth key is positioned adjacent to, and to the right of, the second key;
wherein as both the first key and the third key display prices, the price displayed by the first key is higher than the price displayed by the third key; and
wherein as both the second key and the fourth key display prices, the price displayed by the second key is lower than the price displayed by the fourth key.

20. The apparatus of claim 18,
wherein the first key is positioned adjacent to, and to the left of, the third key;
wherein the second key is positioned adjacent to, and to the right of, the fourth key;
wherein as both the first key and the third key display prices, the price displayed by the first key is lower than the price displayed by the third key; and
wherein as both the second key and the fourth key display prices, the price displayed by the second key is higher than the price displayed by the fourth key.

21. The apparatus of claim 13,
wherein the keyboard further comprises:
a center key comprising a respective LCD that is operable to display to the user of the keyboard a value, wherein the center key is selectable by the user for adjusting a price by the displayed value; and
wherein the logic, when executed by the at least one processor, further directs the at least one processor to:
cause the center key to display to the user of the keyboard a price increment value that is based on prices available in the market for the financial instrument; and
in response to a change in prices available in the market for the financial instrument, cause the price increment value displayed by the center key to change.

22. The apparatus of claim 21,
wherein to determine that the user of the keyboard has i) selected the first key and ii) selected the sell key comprises to determine that that the user of the keyboard has:
i) selected the first key,
ii) selected the sell key, and
iii) selected, at least once, the center key;
wherein the price of the sell command is based at least in part on:
i) the bid price displayed by the first key when selected by the user, and
ii) a price increment value displayed by the center key when selected by the user;
wherein to determine that the user of the keyboard has i) selected the second key and ii) selected the buy key comprises to determine that that the user of the keyboard has:
i) selected the second key,
ii) selected the buy key, and
iii) selected, at least once, the center key; and
wherein the price of the buy command is based at least in part on:
i) the offer price displayed by the second key when selected by the user, and
ii) a price increment value displayed by the center key when selected by the user.

23. The apparatus of claim 22,
wherein as both the first key and the third key display prices, the price displayed by the first key is different from the price displayed by the third key; and
wherein as both the second key and the fourth key display prices, the price displayed by the second key is different from the price displayed by the fourth key.

24. The apparatus of claim 22,
wherein as both the first key and the third key display prices, the price displayed by the first key is higher than the price displayed by the third key; and
wherein as both the second key and the fourth key display prices, the price displayed by the second key is lower than the price displayed by the fourth key.

25. The apparatus of claim 22,
wherein as both the first key and the third key display prices, the price displayed by the first key is lower than the price displayed by the third key; and
wherein as both the second key and the fourth key display prices, the price displayed by the second key is higher than the price displayed by the fourth key.

26. The apparatus of claim 21,
wherein as both the first key and the third key display prices, the price displayed by the first key is different from the price displayed by the third key; and
wherein as both the second key and the fourth key display prices, the price displayed by the second key is different from the price displayed by the fourth key.

27. The apparatus of claim 21,
wherein as both the first key and the third key display prices, the price displayed by the first key is higher than the price displayed by the third key; and
wherein as both the second key and the fourth key display prices, the price displayed by the second key is lower than the price displayed by the fourth key.

28. The apparatus of claim 21,
wherein as both the first key and the third key display prices, the price displayed by the first key is lower than the price displayed by the third key; and
wherein as both the second key and the fourth key display prices, the price displayed by the second key is higher than the price displayed by the fourth key.

29. The apparatus of claim 21, wherein the first key, the second key, the third key, the fourth key, and the center key are positioned on the keyboard in a row.

30. The apparatus of claim 29, wherein the row comprises a horizontal row when the keyboard is in use by the user.

31. The apparatus of claim 30,
wherein the center key is positioned to the right of the first key and the third key; and
wherein the center key is further positioned to the left of the second key and the fourth key.

32. The apparatus of claim 30,
wherein the third key is positioned adjacent to, and to the left of, the first key;
wherein the first key is positioned adjacent to, and to the left of, the center key;
wherein the fourth key is positioned adjacent to, and to the right of, the second key;
wherein the second key is positioned adjacent to, and to the right of, the center key;
wherein as both the first key and the third key display prices, the price displayed by the first key is higher than the price displayed by the third key; and
wherein as both the second key and the fourth key display prices, the price displayed by the second key is lower than the price displayed by the fourth key.

33. The apparatus of claim 30,
wherein the first key is positioned adjacent to, and to the left of, the third key;
wherein the third key is positioned adjacent to, and to the left of, the center key;
wherein the second key is positioned adjacent to, and to the right of, the fourth key;
wherein the fourth key is positioned adjacent to, and to the right of, the center key;
wherein as both the first key and the third key display prices, the price displayed by the first key is lower than the price displayed by the third key; and
wherein as both the second key and the fourth key display prices, the price displayed by the second key is higher than the price displayed by the fourth key.

34. The apparatus of claim 1,
wherein the keyboard further comprises:
a center key comprising a respective LCD configured to display to the user of the keyboard a value, wherein the center key is selectable by the user for adjusting a price by the displayed value; and
wherein the logic, when executed by the at least one processor, further directs the at least one processor to:
cause the center key to display to the user of the keyboard a price increment value that is based on prices available in the market for the financial instrument; and
in response to a change in prices available in the market for the financial instrument, cause the price increment value displayed by the center key to change.

35. The apparatus of claim 34,
wherein to determine that the user of the keyboard has i) selected the first key and ii) selected the sell key comprises to determine that that the user of the keyboard has:
i) selected the first key,
ii) selected the sell key, and
iii) selected, at least once, the center key;
wherein the price of the sell command is based at least in part on:
i) the bid price displayed by the first key when selected by the user, and
ii) a price increment value displayed by the center key when selected by the user;
wherein to determine that the user of the keyboard has i) selected the second key and ii) selected the buy key comprises to determine that that the user of the keyboard has:
i) selected the second key,
ii) selected the buy key, and
iii) selected, at least once, the center key; and
wherein the price of the buy command is based at least in part on:
i) the offer price displayed by the second key when selected by the user, and
ii) a price increment value displayed by the center key when selected by the user.

36. The apparatus of claim 35, wherein the first key, the second key, and the center key are positioned on the keyboard in a row.

37. The apparatus of claim 36, wherein the row comprises a horizontal row when the keyboard is in use by the user.

38. The apparatus of claim 37,
wherein the center key is positioned to the right of the first key; and
wherein the center key is further positioned to the left of the second key.

* * * * *